US007472582B2

(12) United States Patent
Ito et al.

(10) Patent No.: US 7,472,582 B2
(45) Date of Patent: Jan. 6, 2009

(54) LEAK DIAGNOSIS SYSTEM AND LEAK DIAGNOSIS METHOD

(75) Inventors: Shinichi Ito, Nagoya (JP); Nobuhiro Takano, Gifu (JP)

(73) Assignee: Denso Corporation (JP)

( * ) Notice: Subject to any disclaimer, the term of this patent is extended or adjusted under 35 U.S.C. 154(b) by 369 days.

(21) Appl. No.: 11/431,651

(22) Filed: May 11, 2006

(65) Prior Publication Data

US 2006/0254342 A1 Nov. 16, 2006

(30) Foreign Application Priority Data

May 12, 2005 (JP) ............................ 2005-140253
May 13, 2005 (JP) ............................ 2005-141544

(51) Int. Cl.
*G01M 3/04* (2006.01)

(52) U.S. Cl. ........................................ 73/49.7; 73/49.2

(58) Field of Classification Search ................. 73/49.2, 73/49.7

See application file for complete search history.

(56) References Cited

U.S. PATENT DOCUMENTS

| | | | | |
|---|---|---|---|---|
| 6,389,882 | B1 * | 5/2002 | Ohkuma | 73/49.7 |
| 6,807,851 | B2 | 10/2004 | Wakahara et al. | |
| 6,966,214 | B2 | 11/2005 | Watanabe et al. | |
| 2005/0000273 | A1 | 1/2005 | Hosoya et al. | |
| 2005/0039525 | A1 | 2/2005 | Wakahara et al. | |
| 2005/0081612 | A1 | 4/2005 | Hosoya et al. | |

FOREIGN PATENT DOCUMENTS

| | | |
|---|---|---|
| JP | 2004-293438 | 10/2004 |
| JP | 2005-2915 | 1/2005 |

* cited by examiner

*Primary Examiner*—Daniel S Larkin
(74) *Attorney, Agent, or Firm*—Nixon & Vanderhye PC

(57) ABSTRACT

An ECU drives a pump in a first stage at a first pumping capacity. The ECU drives the pump in a second stage after the first stage at a second pumping capacity, which is lower than the first pumping capacity. The second pumping capacity is set such that when at least one leak hole, which forms a predetermined total opening cross sectional area, exists in the purge apparatus, the driving of the pump at the second pumping capacity substantially maintains a predetermined reference pressure in the purge apparatus. The ECU diagnoses whether a leak hole exits in the purge apparatus based on the pressure measured with the pressure sensor in view of the predetermined reference pressure at the time of driving the pump in the second stage at the second pumping capacity.

26 Claims, 12 Drawing Sheets

LEAK DIAGNOSIS SYSTEM AND LEAK DIAGNOSIS METHOD

CROSS REFERENCE TO RELATED APPLICATION

This application is based on and incorporates herein by reference Japanese Patent Application No. 2005-140253 filed on May 12, 2005 and Japanese Patent Application No. 2005-141544 filed on May 13, 2005.

BACKGROUND OF THE INVENTION

1. Field of the Invention

The present invention relates to a leak diagnosis system and a leak diagnosis method.

2. Description of Related Art

In a known purge apparatus, fuel gas, which is generated in a fuel tank of a vehicle is adsorbed by a canister and is then purged into an air intake passage of an internal combustion engine of the vehicle through use of a negative pressure in the intake air passage upon opening of a purge valve installed in a purge passage, which communicates between the canister and the air intake passage. Therefore, leakage of the fuel gas into the surrounding atmosphere is effectively limited. A leak diagnosis system has been proposed to limit a leaked state of the purge apparatus where the purge apparatus is left to leak the fuel gas into the atmosphere. Specifically, the leak diagnosis system diagnoses whether a leak hole exists in the purge apparatus based on an internal pressure of the purge apparatus at the time of depressurizing or pressurizing the interior of the purge apparatus.

Japanese Unexamined Patent Publication No. 2004-293438 discloses such a leak diagnosis system. In the leak diagnosis system of Japanese Unexamined Patent Publication No. 2004-293438, a vacuum pump, which is communicated with the interior of the purge apparatus, is provided, and a suction capacity of the vacuum pump is set to maintain the internal pressure of the purge apparatus to a fixed value when a leak hole, which has a predetermined inner diameter (e.g., a diameter of 0.5 mm), exists in the purge apparatus.

During the diagnosis, the purge apparatus is sealed from the surrounding atmosphere to form a sealed system, and the vacuum pump is driven for a predetermined time period. At this time, when the internal pressure of the purge apparatus becomes the fixed value, it is determined that a leak hole, which has an inner diameter equal to or greater than the predetermined inner diameter, exists in the purge apparatus. Alternatively, when the internal pressure of the purge apparatus becomes higher than the fixed value, it is determined that a leak hole, which has an inner diameter greater than the predetermined inner diameter, exists in the purge apparatus. Also, when the internal pressure of the purge apparatus becomes lower than the fixed value before elapse of the predetermined time period, it is determined that a leak hole does not exist in the purge apparatus.

When the suction capacity of the pump is set to a fixed capacity, like in the case of Japanese Unexamined Patent Publication No. 2004-293438, it is possible to determine whether the leak hole, which has the inner diameter equal to or greater than the predetermined inner diameter, exists in the purge apparatus. However, in a case where a remaining fuel quantity in the fuel tank is relatively small, when the suction capacity of the pump is set to the fixed capacity, it takes a relatively long time period to reduce the internal pressure of the purge apparatus in comparison to a case where the remaining fuel quantity in the fuel tank is relative large, so that the diagnosis takes a relatively long time period. Furthermore, the above diagnosis needs to be performed in a stable state of the vehicle where a pressure change is not induced by swing movement of fuel inside the fuel tank. Thus, the above diagnosis is performed during a stop period or an idling period of the engine. Therefore, when the diagnosis takes a long time period, a driver may possible start the engine or may possibly start driving of the vehicle before completion of the diagnosis to cause the unstable state of the vehicle. As a result, the diagnosis may be interrupted.

In order to quickly reduce the internal pressure of the purge apparatus even in the case of the relatively small remaining fuel quantity in the fuel tank, it is conceivable to use a vacuum pump of a higher capacity. However, when the vacuum pump of the higher capacity is simply used, the internal pressure of the purge apparatus is kept reduced even when the leak hole, which has the inner diameter equal to or greater than the predetermined inner diameter, exists in the purge apparatus. Thus, the leak hole in the purge apparatus may not be detected in such a case.

In the above leak diagnosis, presence of the leak hole in the purge apparatus is diagnosed by measuring the pressure inside the purge apparatus. The pressure inside the fuel tank may change due to a swing movement of fuel in the fuel tank or a change in the atmospheric pressure at the time of traveling along a climbing road. A change in such an external state causes a change in the pressure inside the purge apparatus. When this happens, accurate diagnosis of the leak hole cannot be made. That is, in the leak diagnosis, the pump should be operated to change the pressure inside the purge apparatus only when the pressure inside the purge apparatus is stabilized.

Thus, in Japanese Unexamined Patent Publication No. 2004-293438, the leak diagnosis is executed in an idling state or a stop state of the engine. However, right after stopping of the engine, the pressure inside the fuel tank is not stabilized. Thus, the leak diagnosis in the stop state of the engine should be executed after stabilization of the pressure inside the fuel tank. In Japanese Unexamined Patent Publication No. 2004-293438, the time period, which is required to stabilize the pressure inside the fuel tank, is set to be a predetermined time period (3 to 5 hours), and the leak diagnosis is executed after the elapse of this predetermined time period since the time of stopping the engine.

As described above, Japanese Unexamined Patent Publication No. 2004-293438 teaches that the pressure inside the purge apparatus is stabilized after the elapse of the predetermined time period since the time of stopping the engine. However, in reality, the time period required to stabilize the pressure inside the purge apparatus varies depending on a remaining fuel quantity in the fuel tank, the surrounding temperature and/or the presence of the leak hole. Thus, the above predetermined time period needs to include a surplus time, which is required to sufficiently stabilize the pressure, in view of aging of the system even if the predetermined time period is determined based on the worst environmental conditions, which tend to increase the time period required to stabilize the pressure inside the purge apparatus. Therefore, in some cases, it could happen that the leak diagnosis cannot be executed although the pressure inside the purge apparatus has been already stabilized a long time ago.

Furthermore, in the case where the leak diagnosis cannot be executed until 3 to 5 hours elapse since the time of stopping the engine, when the engine is restarted, the leak diagnosis cannot be made, and the required number of times of leak diagnosis cannot be achieved.

SUMMARY OF THE INVENTION

The present invention is made in view of the above disadvantages. Thus, it is an objective of the present invention to solve or alleviate at least one of the above disadvantages.

To achieve the objective of the present invention, there is provided a leak diagnosis system for a vehicle having an internal combustion engine. The leak diagnosis system includes a fuel tank, a purge apparatus, a pressure sensor, a pump, a primary drive control means, a secondary drive control means and a diagnosing means. The fuel tank receives fuel. The purge apparatus is communicated with the fuel tank and purges fuel gas, which is generated through vaporization of the fuel in the fuel tank, into an intake air pipe of the engine. The pressure sensor senses an internal pressure of the purge apparatus. The pump has an adjustable pump capacity and supplies a pressure to an interior of the purge apparatus. The primary drive control means is for driving the pump in a first stage at a first pumping capacity. The secondary drive control means is for driving the pump in a second stage after the first stage at a second pumping capacity, which is lower than the first pumping capacity. The second pumping capacity is set such that when at least one leak hole, which forms a predetermined total opening cross sectional area, exists in the purge apparatus, the driving of the pump at the second pumping capacity by the secondary drive control means substantially maintains a predetermined reference pressure in the purge apparatus. The diagnosing means is for diagnosing whether a leak hole exits in the purge apparatus based on the pressure measured with the pressure sensor in view of the predetermined reference pressure at the time of driving the pump in the second stage at the second pumping capacity by the secondary drive control means.

To achieve the objective of the present invention, there is also provided a leak diagnosis system for a vehicle having an internal combustion engine. The leak diagnosis system includes a fuel tank, a purge apparatus, a pressure sensor, a pump and a controller. The fuel tank receives fuel. The purge apparatus is communicated with the fuel tank and purges fuel gas, which is generated through vaporization of the fuel in the fuel tank, into an intake air pipe of the engine. The pressure sensor senses an internal pressure of the purge apparatus. The pump has an adjustable pump capacity and supplies a pressure to an interior of the purge apparatus. The controller controls the pump and diagnoses whether a leak hole exists in the purge apparatus. The controller drives the pump in a first stage at a first pumping capacity. The controller drives the pump in a second stage after the first stage at a second pumping capacity, which is lower than the first pumping capacity. The second pumping capacity is set such that when at least one leak hole, which forms a predetermined total opening cross sectional area, exists in the purge apparatus, the driving of the pump at the second pumping capacity substantially maintains a predetermined reference pressure in the purge apparatus. The controller diagnoses whether a leak hole exits in the purge apparatus based on the pressure measured with the pressure sensor in view of the predetermined reference pressure at the time of driving the pump in the second stage at the second pumping capacity.

To achieve the objective of the present invention, there is also provided a leak diagnosis system for a vehicle having an internal combustion engine. The leak diagnosis system includes a fuel tank, a purge apparatus, a pump, at least one pressure related information sensor and a controller. The fuel tank receives fuel. The purge apparatus is communicated with the fuel tank and purges fuel gas, which is generated through vaporization of the fuel in the fuel tank, into an intake air pipe of the engine. The pump supplies a pressure to an interior of the purge apparatus. Each of the at least one pressure related information sensor measures a corresponding pressure related information value, which changes in response to a pressure change in the purge apparatus. The controller determines whether the at least one pressure related information value measured with the at least one pressure related information sensor is substantially stabilized. When the controller determines that the at least one pressure related information value is substantially stabilized, the controller drives the pump to supply the pressure to the interior of the purge apparatus and diagnoses whether a leak hole exists in the purge apparatus based on an internal pressure of the purge apparatus.

To achieve the objective of the present invention, there is also provided a leak diagnosis method. According to the method, a pump is driven in a first stage at a first pumping capacity. The pump supplies a pressure to an interior of a purge apparatus that is communicated with a fuel tank of a vehicle and purges fuel gas, which is generated through vaporization of fuel in the fuel tank, into an intake air pipe of an internal combustion engine of the vehicle. Furthermore, the pump is driven in a second stage after the first stage at a second pumping capacity, which is lower than the first pumping capacity. The second pumping capacity is set such that when at least one leak hole, which forms a predetermined total opening cross sectional area, exists in the purge apparatus, the driving of the pump at the second pumping capacity substantially maintains a predetermined reference pressure in the purge apparatus. It is diagnosed whether a leak hole exits in the purge apparatus based on an internal pressure of the purge apparatus measured with a pressure sensor in view of the predetermined reference pressure at the time of driving the pump in the second stage at the second pumping capacity.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
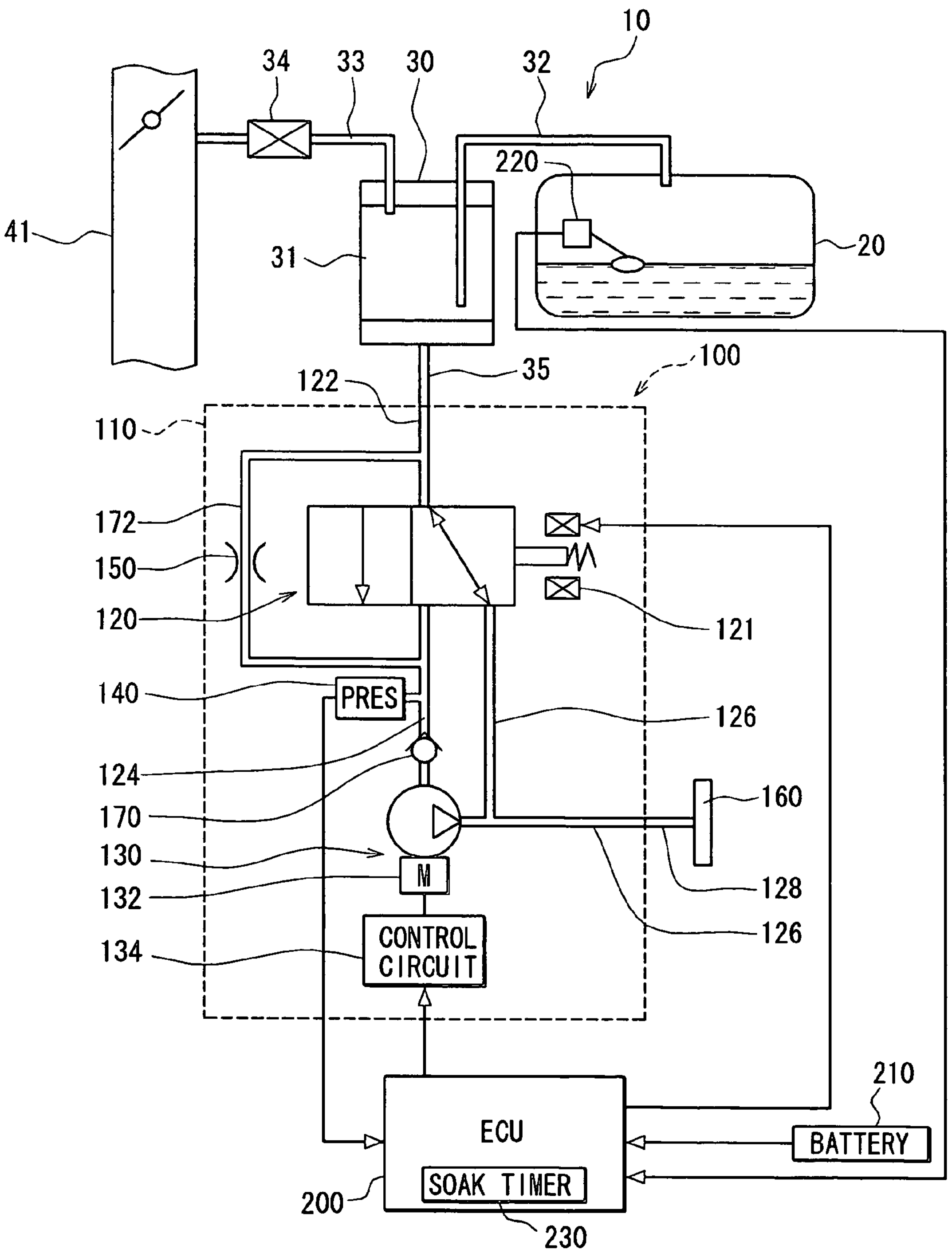
FIG. 1 is a schematic diagram showing a structure of a purge apparatus and a leak diagnosis system according to a first embodiment of the present invention.

A leak diagnosis system according to a first embodiment of the present invention will be described with reference to the accompanying drawings. FIG. 1 is a schematic diagram showing a structure of a purge apparatus 10 and a structure of the leak diagnosis system 100. The purge apparatus 10 includes a canister 30, a connecting pipe 32, a valve pipe 33 and a purge valve 34. The connecting pipe 32 connects between the canister 30 and a fuel tank 20. Adsorbent (such as activated carbon) 31 is filled in the canister 30. When fuel gas, which has been initially vaporized in the fuel tank 20, is introduced into the canister 30 through the connecting pipe 32, the adsorbent 31 adsorbs the fuel gas.

The valve pipe 33 connects between the canister 30 and an intake air pipe 41. The intake air pipe 41 supplies the air to an internal combustion engine (hereinafter, simply referred to as an engine). The purge valve 34 is inserted into the valve pipe 33. The purge valve 34 is a solenoid valve, which has an adjustable opening degree. When the purge valve 34 is opened (an open state), the canister 30 and the intake air pipe 41 are communicated with each other through the purge valve 34. Therefore, the fuel gas, which is released from the adsorbent 31, is drawn into and is thus purged into the intake air pipe 41 due to the negative pressure inside the intake air pipe 41.

The leak diagnosis system 100, which diagnoses whether a leak hole exists in the purge apparatus 10, includes a leak check module 110, an electronic control unit (ECU or simply referred to as a controller) 200, a battery 210 and a fuel level sensor 220.

The leak check module 110 includes a changeover valve 120, an electric vacuum pump 130, a pressure sensor 140 and a reference orifice 150. The changeover valve 120 is connected to the canister 30 through a connecting pipe 35 and a canister communication passage 122. Furthermore, the changeover valve 120 is connected to the vacuum pump 130 through a negative pressure introducing passage 124. Also, an atmosphere communication passage 126 is connected to the changeover valve 120. The atmosphere communication passage 126 is connected to one end of a connecting pipe 128, and the other end of the connecting pipe 128 is communicated with the atmosphere (surrounding atmosphere) through an air filter 160.

The changeover valve 120 is a three way solenoid valve. The ECU 200 controls energization of a coil 121 of the changeover valve 120, so that the changeover valve 120 is shifted between an atmosphere communicating state (a state of FIG. 1 also referred to as a first state) and a negative pressure introducing state (also referred to as a second state). In the atmosphere communicating state, the changeover valve 120 communicates between the canister communication passage 122 and the atmosphere communication passage 126. In the negative pressure introducing state, the changeover valve 120 communicates between the canister communication passage 122 and the negative pressure introducing passage 124. A check valve 170 is inserted into the negative pressure introducing passage 124. In a non-operating state (a stop state) of the vacuum pump 130, the check valve 170 is closed to limit backflow of the atmospheric air into the negative pressure introducing passage 124.

The reference orifice 150 is provided in a middle of a bypass passage 172, which always connects between the canister communication passage 122 and the negative pressure introducing passage 124 while bypassing the changeover valve 120. An inner diameter of the reference orifice 150 is determined based on an inner diameter (or a total opening cross sectional area) of a subject leak hole(s), which needs to be detected in the purge apparatus 10. For instance, the inner diameter of the reference orifice 150 may be set to 0.5 mm or 0.45 mm. An inner diameter of the bypass passage 172, an inner diameter of the canister communication passage 122, an inner diameter of the negative pressure introducing passage 124 and an inner diameter of the atmosphere communication passage 126 are sufficiently larger than the inner diameter of the reference orifice 150.

The pressure sensor 140 is connected to the negative pressure introducing passage 124 on a vacuum pump 130 side of a connection between the bypass passage 172 and the negative pressure introducing passage 124.

The vacuum pump 130 has a known displacement pump structure and is provided with an electric motor 132. A drive control circuit 134 controls an operation of the motor 132. Specifically, the drive control circuit 134 controls a rotational speed of the motor 132 by controlling electric power supplied from the battery 210 to the motor 132 based on a drive signal transmitted from the ECU 200. In the present embodiment, a width of a pulse signal, which is the drive signal outputted from the ECU 200, is modulated, i.e., is processed through pulse width modulation to control the rotational speed of the motor 132, and thereby a suction quantity of the vacuum pump 130 is controlled. Therefore, the vacuum pump 130 is a capacity variable pump, which can change the suction quantity, i.e., the capacity (the pumping capacity) of the pump.

When the purge valve 34 is closed, and the changeover valve 120 is placed into the negative pressure introducing state, the purge apparatus 10 and the leak check module 110 are placed into a sealed state and thereby form a sealed system (a closed system). In this state, when the vacuum pump 130 is driven to evacuate the gas from an interior of the purge apparatus 10, the negative pressure prevails in the interior of the sealed system, and this negative pressure, i.e., the pressure p in the purge apparatus 10 is measured with the pressure sensor 140.

In contrast, in another state where the purge valve 34 is closed, and the changeover valve 120 is placed into the atmosphere communicating state, when the vacuum pump 130 is turned off, the atmospheric pressure prevails in the interior of the purge apparatus 10 and the interior of the leak check module 110, and this atmospheric pressure is measured with the pressure sensor 140. Furthermore, in this state where the purge valve 34 is closed, and the changeover valve 120 is communicated with the atmosphere, when the vacuum pump 130 is driven, the atmosphere communication passage 126, the canister communication passage 122 and a canister communication passage 122 side of the bypass passage 172, which is located on the canister communication passage 122 side of the reference orifice 150, have the atmospheric pressure. Also, at that time, the negative pressure introducing passage 124 and a negative pressure introducing passage 124 side of the bypass passage 172, which is located on the negative pressure introducing passage 124 side of the reference orifice 150, have the negative pressure. This negative pressure is measured with the pressure sensor 140.

In the previously proposed leak diagnosis system, the suction capacity (hereinafter, this suction capacity will be referred to as a reference suction capacity b) of the previously proposed vacuum pump is set to maintain the constant measured pressure, which is measured with the pressure sensor 140 at the time of placing the changeover valve 120 into the atmosphere communicating state and driving the vacuum pump. In contrast, the vacuum pump 130 of the present embodiment can be operated at the reference suction capacity (a second pumping capacity) b and can be also operated at a higher suction capacity (a first pumping capacity) a, which is higher than the reference suction capacity b.

For example, here it is assumed that the suction capacity of the vacuum pump 130 is now set to the reference suction capacity b, and the vacuum pump 130 is driven while the purge apparatus 10 is sealed to form the sealed system. In this state, when a leak hole, which has the inner diameter that is substantially the same as that of the reference orifice 150, exists in the purge apparatus 10, the measured pressure, which is measured with the pressure sensor 140, becomes a constant value (hereinafter, referred to as a determination reference pressure β) after elapse of a predetermined time period from the time of starting the vacuum pump 130. In contrast, when a larger leak hole, which has the inner diameter that is larger than that of the reference orifice 150, exists in the purge apparatus 10, the measured pressure, which is measured with the pressure sensor 140, becomes a larger value, which is larger than the determination reference pressure β, after the elapse of the predetermined time period. Furthermore, when no leak hole is present or when a smaller leak hole, which has the inner diameter that is sufficiently smaller than that of the reference orifice 150, exists in the purge apparatus 10, the measured pressure p, which is measured with the pressure sensor 140, becomes equal to or less than the determination reference pressure β before elapse of the predetermined time period. Thus, the presence of the leak hole(s) can be diagnosed, i.e., can be determined. In the above example, the inner diameter of the reference orifice 150 is compared with the inner diameter of the leak hole for the illustrative purpose. Alternatively, it is also possible to compare the total opening cross sectional area of the reference orifice 150 with a total opening cross sectional area of one or more leak holes in the purge apparatus 10. More specifically, for instance, when two leak holes, which have the total opening cross sectional area that is substantially the same as the total opening cross sectional area of the reference orifice 150, exist in the purge apparatus 10, the measured pressure, which is measured with the pressure sensor 140, becomes the constant value β after elapse of the predetermined time period from the time of starting the vacuum pump 130, and so on.

A signal, which indicates a voltage of the battery 210, is supplied to the ECU 200. Furthermore, the fuel level sensor 220 is placed in the fuel tank 20 to measure the remaining gasoline (fuel) quantity and outputs a signal, which indicates the measured remaining gasoline quantity, to the ECU 200.

The ECU 200 is a computer, which includes a CPU, a ROM and a RAM (not shown). Furthermore, a soak timer 230 is installed in the ECU 200. The soak timer 230 is started to measure time when an ignition switch (not shown) is turned off, i.e., when the engine is stopped. Therefore, the soak timer 230 measures the elapsed time since the time of stopping the engine. At the time of diagnosing the leak in the purge apparatus 10, the ECU 200 controls the vacuum pump 130 and the changeover valve 120 based on the signal, which is supplied from the battery 210, and the signal, which is supplied from the fuel level sensor 220.

Figure 2:
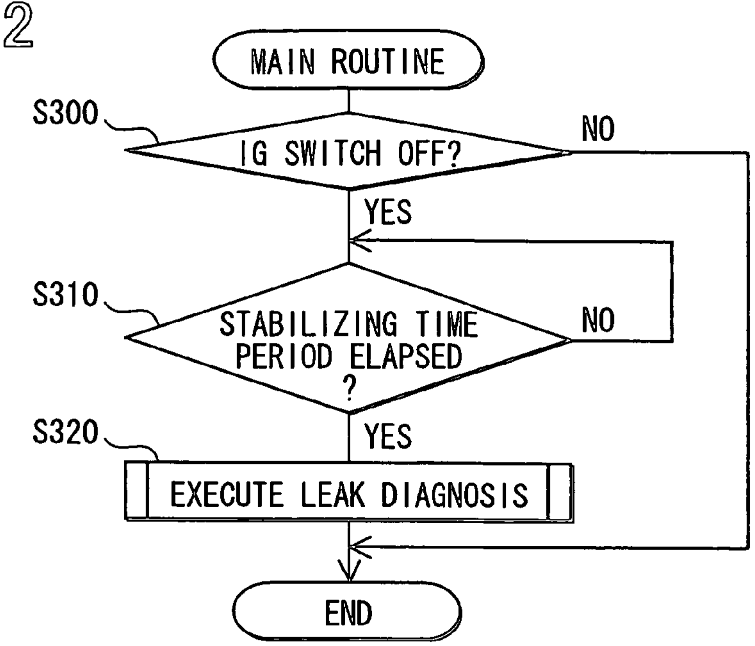
FIG. 2 is a main routine of a leak diagnosis control process executed by an ECU shown in FIG. 1.

Next, a leak diagnosis control operation, which is executed by the ECU 200, will be described. FIG. 2 shows a main routine of the leak diagnosis control operation executed by the ECU 200. This main routine is executed at relatively short intervals.

In FIG. 2, at step S300, it is determined whether the ignition switch (the IG switch) is in an OFF state, i.e., whether the engine is in a stop state (i.e., in the state where the engine is not running). When NO is returned at step S300, the current routine ends. In contrast, when it is determined that the IG switch is in the OFF state at step S300, control proceeds to step S310. At step S310, it is determined whether the measured time period, which is measured with the soak timer 230, i.e., the time period, which has been measured since the time of determining the OFF state of IG switch at step S300, has passed an end of a preset stabilizing time period. The stabilizing time period is a time period, which is required to stabilize the internal pressure of the fuel tank 20. This stabilizing time period is determined through experiments and may be set to, for example, 3 to 5 hours in this instance.

When NO is returned at step S310, this step S310 is repeated. In contrast, when YES is returned at step S310, control proceeds to step S320. At step S320, a leak diagnosis routine, which is indicated in FIG. 3 in detail, is executed.

Figure 4:
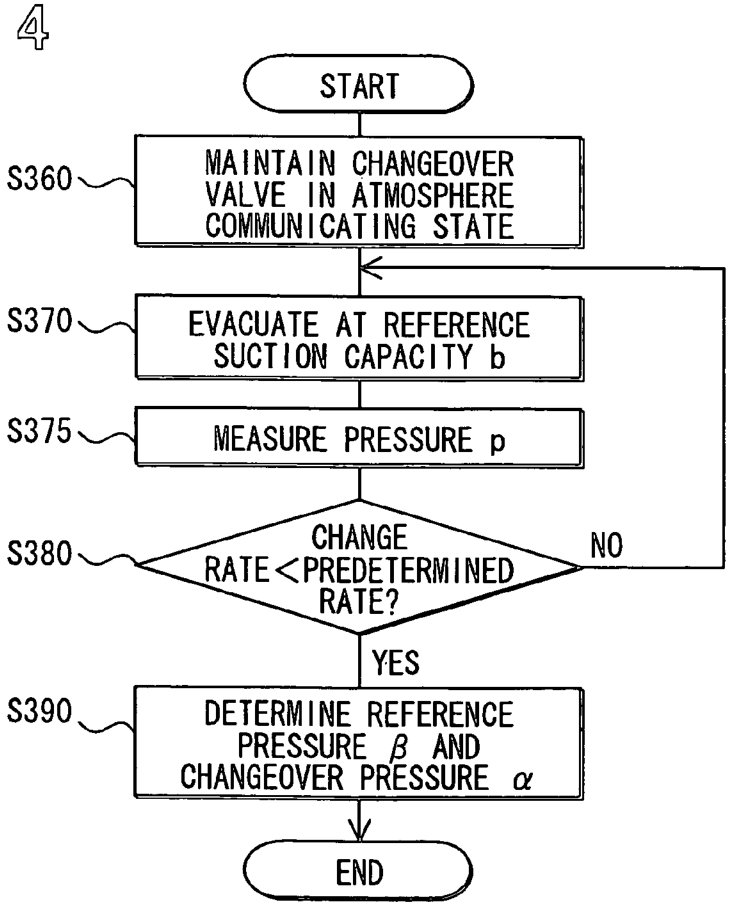
FIG. 4 is a leak diagnosis routine indicating a control operation of step S350 of FIG. 3 in detail.
Figure 3:
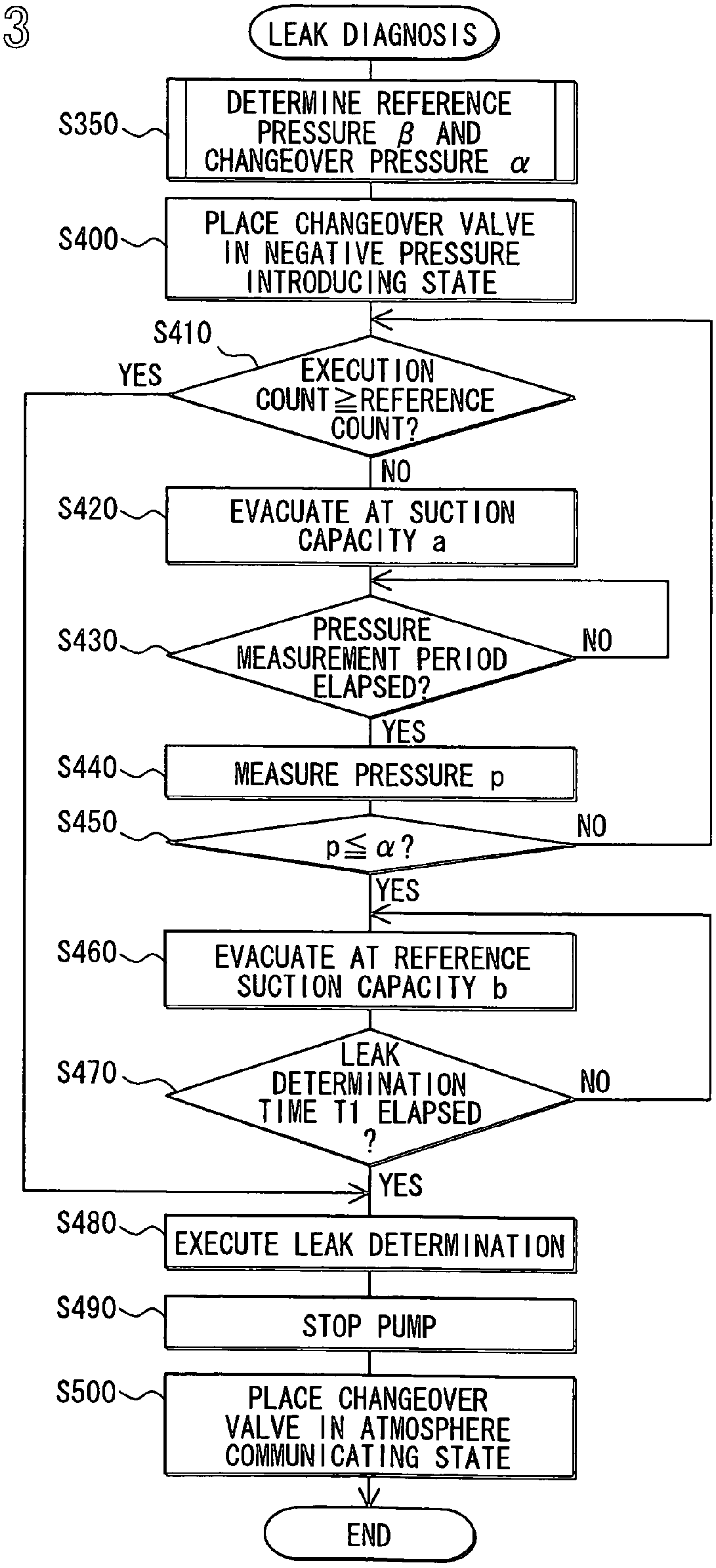
FIG. 3 is a leak diagnosis routine indicating a control operation of step S320 of FIG. 2 in detail.

In the leak diagnosis routine of FIG. 3, first, the reference pressure β (and a changeover pressure α) is determined at step S350. Actually, this step S350 executes steps S360 to S390 of FIG. 4. In FIG. 4, the changeover valve 120 is maintained in the atmosphere communicating state at step S360. Then, control proceeds to step S370. At step S370, a predetermined pulse signal is outputted to the drive control circuit 134, so that the vacuum pump 130 is driven to evacuate at the reference suction capacity b, which has been previously set. Then, at step S375, the pressure p is measured. That is, at step S375, the signal from the pressure sensor 140 is read.

Thereafter, at step S380, it is determined whether a change rate of the pressure p, which is measured every time step S375 is repeated, becomes slower than a predetermined rate in order to determine whether the pressure p has become a constant value (or substantially the constant value). When NO is returned at step S380, control returns to step S370 to maintain the evacuating operation of the vacuum pump 130 at the reference suction capacity b.

In contrast, when YES is returned at step S380, control proceeds to step S390. At step S390, the pressure p, which is measured with the pressure sensor 140, is set, i.e., determined to be the reference pressure β. Furthermore, a sum of the reference pressure β and a predetermined value is set, i.e., determined as the changeover pressure α. Here, the changeover pressure α should be somewhere between the determination reference pressure β and the atmospheric pressure. However, desirably, the changeover pressure α is between the reference pressure β and the atmospheric pressure and is closer to the reference pressure β than the atmospheric pressure.

After execution of step S390, step S400 and the following steps shown in FIG. 3 are executed. Specifically, at step S400, the changeover valve 120 is changed to the negative pressure introducing state. In the OFF state of the IG switch, the purge valve 34 is in the fully closed state. Thus, after execution of step S400, the purge apparatus 10 and the leak check module 110 form the sealed system.

Next, steps S410 to S450, which correspond to a primary drive control means of the present invention, are executed. First, at step S410, it is determined whether a pressure determination execution count (i.e., a total number of times of executing the pressure determination at step S450) is equal to or greater than a predetermined reference count. Step S410 is provided in view of a case where the pressure p in the purge apparatus 10 does not decrease to the changeover pressure α even after duration of the evacuating operation of the vacuum pump 130 at the higher suction capacity a for the predetermined period. When YES is returned at step S410, it is assumed that a relatively large leak hole exists in the purge apparatus 10. When YES is returned at step S410, control proceeds to step S480.

In contrast, when NO is returned at step S410, a predetermined pulse signal is outputted to the drive control circuit 134 at step S420, so that the vacuum pump 130 is driven to evacuate at the predetermined high suction capacity a. When step S420 has been executed twice or more, the vacuum pump 130 has been already driven, i.e., has been already running. Thus, in such a case, the driving of the vacuum pump 130 at the predetermined high suction capacity a is maintained at step S420.

Next, at step S430, it is determined whether a predetermined time period has elapsed since the time of starting the driving of the vacuum pump 130 at the suction capacity a, or alternatively it is determined whether a predetermined pressure measurement period has elapsed since the previous execution of step S440. This pressure measurement period is set to be a period of executing the step 440 multiple times until the pressure p in the purge apparatus 10 is reduced from the atmospheric pressure to the changeover pressure α when the interior of the purge apparatus 10 is evacuated by the vacuum pump 130 at the suction capacity a. Thus, step S450 is first executed when the pressure p in the purge apparatus 10 is substantially reduced from the changeover pressure α. As a result, it is possible to limit a delay in the change to the reference suction capacity b.

When NO is returned at step S430, the determination at this step S430 is repeatedly executed until the pressure measurement period elapses. When YES is returned at step S430, the pressure p in the purge apparatus 10 is measured at step S440. Specifically, the signal from the pressure sensor 140 is read at step S440.

Next, at step S450, it is determined whether the pressure p, which is measured at step S440, has been reduced to the changeover pressure α determined at step S350 or below. When NO is returned at step S450, control returns to step S410 to maintain the evacuating operation of the vacuum pump 130 at the suction capacity a. In contrast, when the pressure p in the purge apparatus 10 has been reduced to the changeover pressure α or below, and thereby YES is returned at step S450, control proceeds to step S460. At step S460, the rotational speed of the electric motor 132 is reduced from the current rotational speed of the electric motor 132, and the pulse signal, which changes the suction capacity of the vacuum pump 130 to the reference suction capacity b, is outputted to the drive control circuit 134.

Next, at step S470, it is determined whether the elapsed time, which has been measured since the initial execution of step S460, has exceeded a leak determination time T1, which has been determined through experiments. As discussed above, the purge apparatus 10 and the leak check module 110 form the sealed system. Thus, when the remaining fuel quantity in the fuel tank 20 is made zero, a gas volume in the sealed system can be computed in advance. Furthermore, when step S460 is first executed, the pressure in the purge apparatus 10 is generally the changeover pressure α. Thus, when it is assumed that the leak hole does not exist in the purge apparatus 10, it is possible to previously compute required time, which is required to change the pressure in the purge apparatus 10 from the changeover pressure α to the reference pressure β while evacuating at the suction capacity b. The above leak determination time T1 is set in advance as a sum of this required time and a predetermined surplus time.

When NO is returned at step S470, the evacuating operation of the vacuum pump 130 at the reference capacity b is continued by repeating steps S460, S470 until the leak determination time T1 elapses. In FIG. 3, steps S460, 5470 correspond to a secondary drive control means of the present invention.

In contrast, when YES is returned at step S470, control proceeds to step S480. At step S480, leak determination is executed. Specifically, at step S480, the pressure p in the purge apparatus 10 is detected by reading the signal form the pressure sensor 140. Then, when the detected pressure p is lower than the reference pressure β determined at step S350, it is determined the leak hole does not exist in the purge apparatus 10. In contrast, when the detected pressure p is generally equal to the reference pressure β, it is determined that the leak hole, which has the inner diameter that is generally the same as the inner diameter of the reference orifice 150, exists in the purge apparatus 10, or it is alternatively determined that the leak hole(s), which has the total opening cross sectional area that is generally the same as the total opening cross sectional area of the reference orifice 150, exits in the purge apparatus 10. Furthermore, when the detected pressure p is greater than the reference pressure β, it is determined that the leak hole, which has the inner diameter that is greater than the inner diameter of the reference orifice 150, exists in the purge apparatus 10, or it is alternatively determined that the leak hole(s), which has the total opening cross sectional area that is greater than the total opening cross sectional area of the reference orifice 150, exits in the purge apparatus 10. The above steps S420 to S450 serve as a first stage, and the above steps S460 to S480 serve as a second state.

When the leak determination at step S480 ends, control proceeds to step S490. At step S490, the vacuum pump 130 is stopped. Then, at step S500, the changeover valve 120 is placed in the atmosphere communicating state, and the current routine is terminated.

Figure 5:
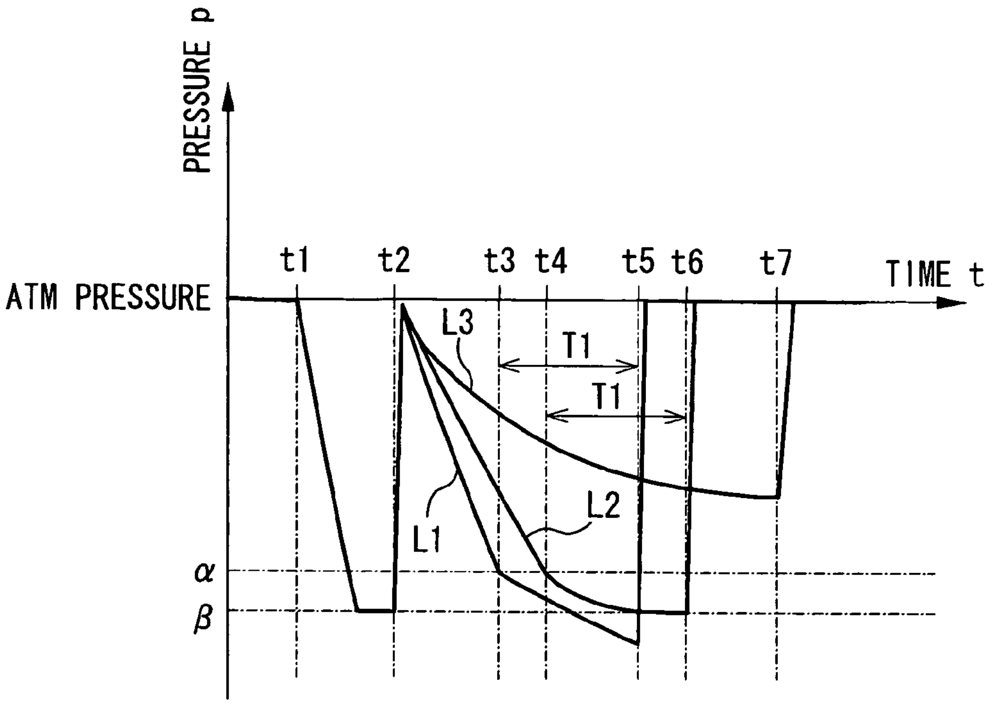
FIG. 5 is a time chart showing an exemplary change in the pressure in the purge apparatus with respect to time upon execution of the leak diagnosis routine of FIG. 3.

FIG. 5 is an exemplary time chart showing a change in the pressure p with respect to the elapsed time in the case of executing the leak diagnosis routine of FIG. 3. In FIG. 5, a solid line L1 indicates the case where the leak hole does not exist in the purge apparatus 10, and a solid line L2 indicates the case where the leak hole, which has the inner diameter that is generally the same as the inner diameter of the reference orifice 150, exists in the purge apparatus 10. Furthermore, a solid line L3 indicates the case where the leak hole, which has the inner diameter that is greater than the inner diameter of the reference orifice 150, exists in the purge apparatus 10.

When the evacuating operation of the vacuum pump 130 at the reference suction capacity b starts at step S370 of FIG. 4, the pressure p in the purge apparatus 10 begins to decrease at time T1 in FIG. 5. When YES is returned at step S380 at time t2 where the pressure p is stabilized at a constant value (or substantially the constant value), the current pressure p is set as the reference pressure β, and the changeover pressure α is set based on this reference pressure β. Then, when the changeover valve 120 is placed in the negative pressure introducing state at step S400 of FIG. 3, the interior of the purge apparatus 10, in which the atmospheric pressure prevails, is now communicated with the pressure sensor 140 while bypassing the reference orifice 150. Therefore, the pressure p temporarily increases close to the atmospheric pressure. However, the evacuating operation of the vacuum pump 130 at the suction capacity a starts soon, so that the pressure p begins to decrease once again. Then, the result of the determination at step S450 becomes YES at time t3 in the case of the solid line L1 and at time t4 in the case of the solid line L2, so that suction capacity of the vacuum pump 130 is changed to the reference suction capacity b, like in the previously proposed case. Then, in the case of the solid line L1, the leak determination is made at time t5 after elapse of the leak determination time T1 from the time t3. Here, the pressure p at the time t5 is smaller than the reference pressure β, so that it is determined that the leak hole does not exist in the purge apparatus 10. Furthermore, in the case of the solid line L2, the leak determination is made at time t6 after elapse of the leak determination time T1 from the time t4. Here, the pressure p at the time t6 is generally the same as the reference pressure β, so that it is determined that the leak hole, which has the inner diameter that is generally the same as the inner diameter of the reference orifice 150, exists in the purge apparatus 10. In the case of the solid line L3, the pressure p in the purge apparatus 10 does not decrease to the changeover pressure α, so that the result of the determination at step S410 becomes YES at, for example, time t6, and the leak determination is made.

In the present embodiment, the vacuum pump 130, which has the variable suction quantity, is provided. Similar to the previously proposed technique, before the execution of steps S460, S470 (the secondary drive control means), at which the vacuum pump 130 is driven at the reference suction capacity b that makes the pressure p in the purge apparatus 10 to be constant in the case of existence of the leak hole having the predetermined inner diameter in the purge apparatus 10, steps S410 to S450 (the primary drive control means) are executed to drive the vacuum pump 130 at the suction capacity a, which is higher than the reference suction capacity b of steps S460, 470 (the secondary drive control means). Thus, the interior of the purge apparatus 10 is depressurized with less time in comparison to the previously proposed technique. Therefore, it is possible to diagnose whether the leak hole exists in the purge apparatus 10 with less time in comparison to the previously proposed technique. Also, since the diagnosis can be made within the shorter period of time, there is a reduced risk of interrupting the diagnosis, which would be caused by, for example, restarting of the engine in the middle of the diagnosis. Thus, the required number of times of diagnosis can be achieved.

Also, in the present embodiment, the change from the suction capacity a to the reference suction capacity b is performed based on the pressure p in the purge apparatus 10. Thus, in comparison to the case where the change from the suction capacity a to the reference suction capacity b is performed based on the determination of whether the predetermined time period has elapsed, the present embodiment allows minimization of the diagnosis time regardless of the change in the remaining fuel quantity in the fuel tank 20.

Second Embodiment

Next, a second embodiment of the present invention will be described. In the following description, components similar to those of the first embodiment will be indicated by the same numerals and will not be described further.

The second embodiment differs from the first embodiment only in the control function of the ECU 200. Specifically, in the second embodiment, a leak diagnosis routine shown in FIG. 6 is executed in place of the leak diagnosis routine of FIG. 3 of the first embodiment.

Figure 6:
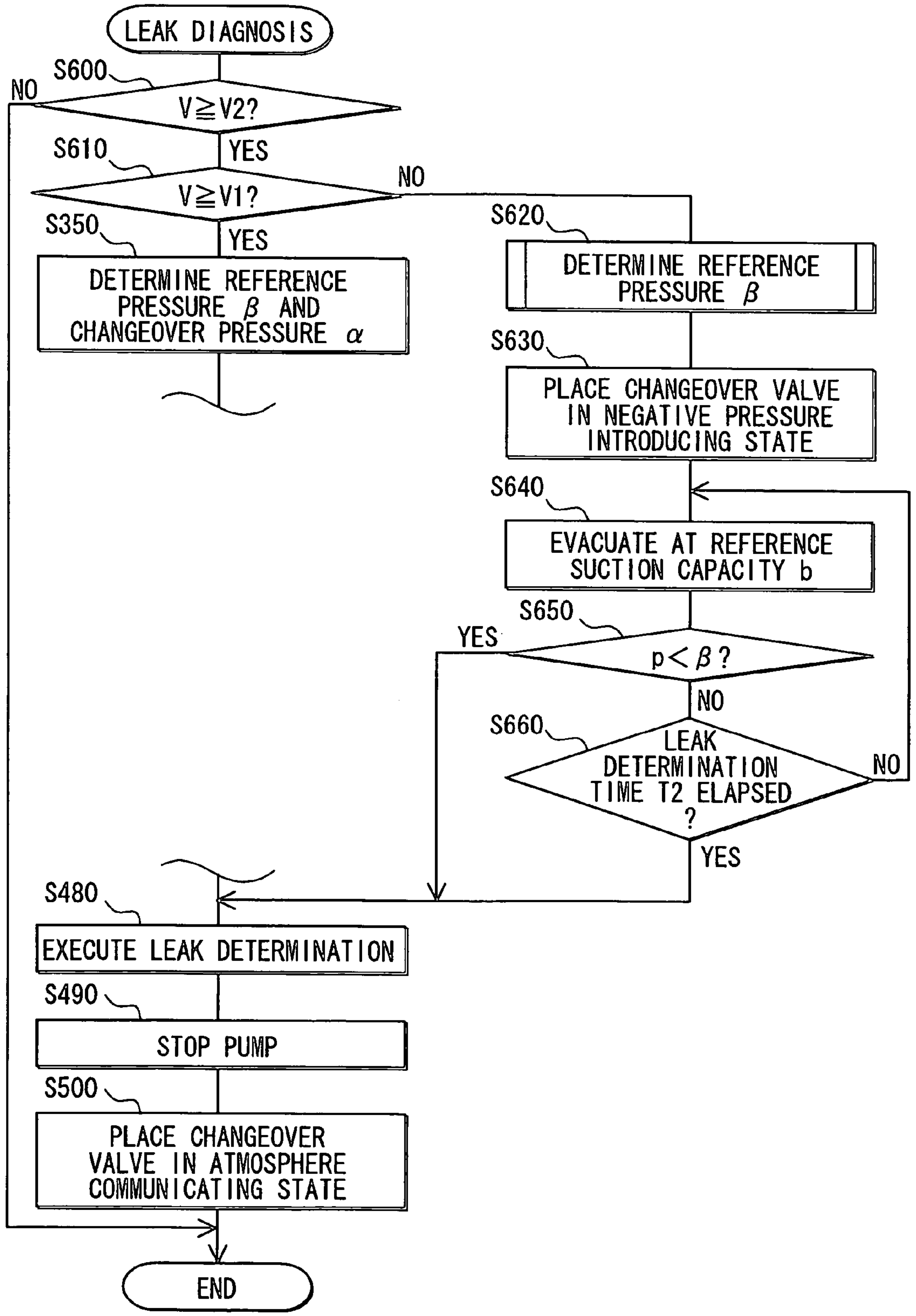
FIG. 6 is a leak diagnosis routine according to a second embodiment of the present invention.

In FIG. 6, at step S600, it is determined whether the voltage (a remaining charge level) V of the battery 210 is equal to or greater than a secondary control enabling value (a secondary control enabling voltage) V2. The secondary control enabling value V2 is the minimum voltage, which enables the above secondary drive control operation, i.e., the single step pump control operation using only the reference suction capacity b like in the previously proposed technique. The secondary control enabling value V2 is set in advance through, for example, the experiments. When NO is returned at step S600, the leak diagnosis cannot be made, so that the current routine is terminated.

In contrast, when YES is returned at step S600, control proceeds to step S610. At step S610, it is determined whether the voltage V of the battery 210 is equal to or greater than a primary control enabling value (a primary control enabling voltage) V1. The primary control enabling value V1 is the minimum voltage, which enables the secondary drive control operation as well as the primary drive control operation, i.e., which enables the above leak diagnosis routine of FIG. 3. This primary control enabling value V1 is determined through, for example, experiments. When YES is returned at step S610, i.e., when the sufficient battery capacity exists, control proceeds to step S350 of FIG. 3, so that the steps shown in FIG. 3 are executed.

In contrast, when NO is returned at step S610, control proceeds to step S620 to execute the leak diagnosis. First, at step S620, the reference pressure β is set. Step S620 is similar to steps S360 to S390 of FIG. 4 except the following point. That is, although the changeover pressure α is set in addition to the reference pressure β at step S390 of the first embodiment, the changeover pressure α is not set at step S620 of the second embodiment. Other than this point, the rest of step S620 is the same as steps S360 to S390 of the first embodiment.

Then, at step S630, similar to step S400, the changeover valve 120 is changed to the negative pressure introducing state, like step S400 of the first embodiment. Then, at step S640, the predetermined pulse signal is outputted to the drive control circuit 134 to drive the vacuum pump 130 at the reference suction capacity b described above. When step S640 has been executed twice or more, the vacuum pump 130 has been already driven. Thus, in such a case, the driving of the vacuum pump 130 at the reference suction capacity b is maintained at step S640.

Then, at step S650, it is determined whether the pressure p, which is measured with the pressure sensor 140, is lower than the reference pressure β. When NO is returned at step S650, control proceeds to step S660 to make another determination. Specifically, at step S660, it is determined whether the elapsed time since the time of initiating the driving of the vacuum pump 130 at the reference suction capacity b, i.e., the elapsed time since the time of initially executing step S640 has exceeded a predetermined leak determination time T2. The leak determination time T2 is a sum of a required time and a predetermined surplus time. The required time is a time that is required to reduce the internal pressure of the sealed system including the purge apparatus 10 from the atmospheric pressure to the reference pressure β when the evacuating operation of the vacuum pump 130 is performed at the reference suction capacity b in the case where the leak hole does not exist in the purge apparatus 10. The leak determination time T2 is longer than the leak determination time T1. When NO is returned at step S660, control returns to step S640. Here, steps S640 to S660 correspond to the secondary drive control means of the present invention.

When steps S640 to S660 are repeated, and thereby the pressure p, which is measured with the pressure sensor 140, becomes lower than the reference pressure β before the elapse of the leak determination time T2, YES is returned at step S650, so that step S480 and the following steps are executed. Furthermore, when the pressure p does not decrease to the reference pressure β even after the elapsing of the leak determination time T2, and thereby YES is returned at step S660, control also proceeds to step S480. In this case, at step S480, it is determined that the leak hole, which has the inner diameter that is equal to or greater than the inner diameter of the reference orifice 150, exists in the purge apparatus 10, or it is alternatively determined that the leak hole(s), which has the total opening cross sectional area that is generally the same as or greater than the total opening cross sectional area of the reference orifice 150, exits in the purge apparatus 10.

According to the second embodiment, even in the case where the battery capacity is relatively low, and execution of the primary drive means, which imposes the relatively large load on the battery due to the relatively high suction capacity, will likely cause the depletion of the charge in the battery, the interior of the purge apparatus 10 can be depressurized only by the secondary drive control means (steps S640 to S660). Thus, the leak diagnosis can be performed without causing depletion of the charge in the battery according to the second embodiment.

Third Embodiment

Next, a third embodiment of the present invention will be described. The third embodiment differs from the first embodiment only in the control function of the ECU 200. Specifically, in the third embodiment, a leak diagnosis routine shown in FIG. 7 is executed in place of the leak diagnosis routine of FIG. 3 of the first embodiment.

Figure 7:
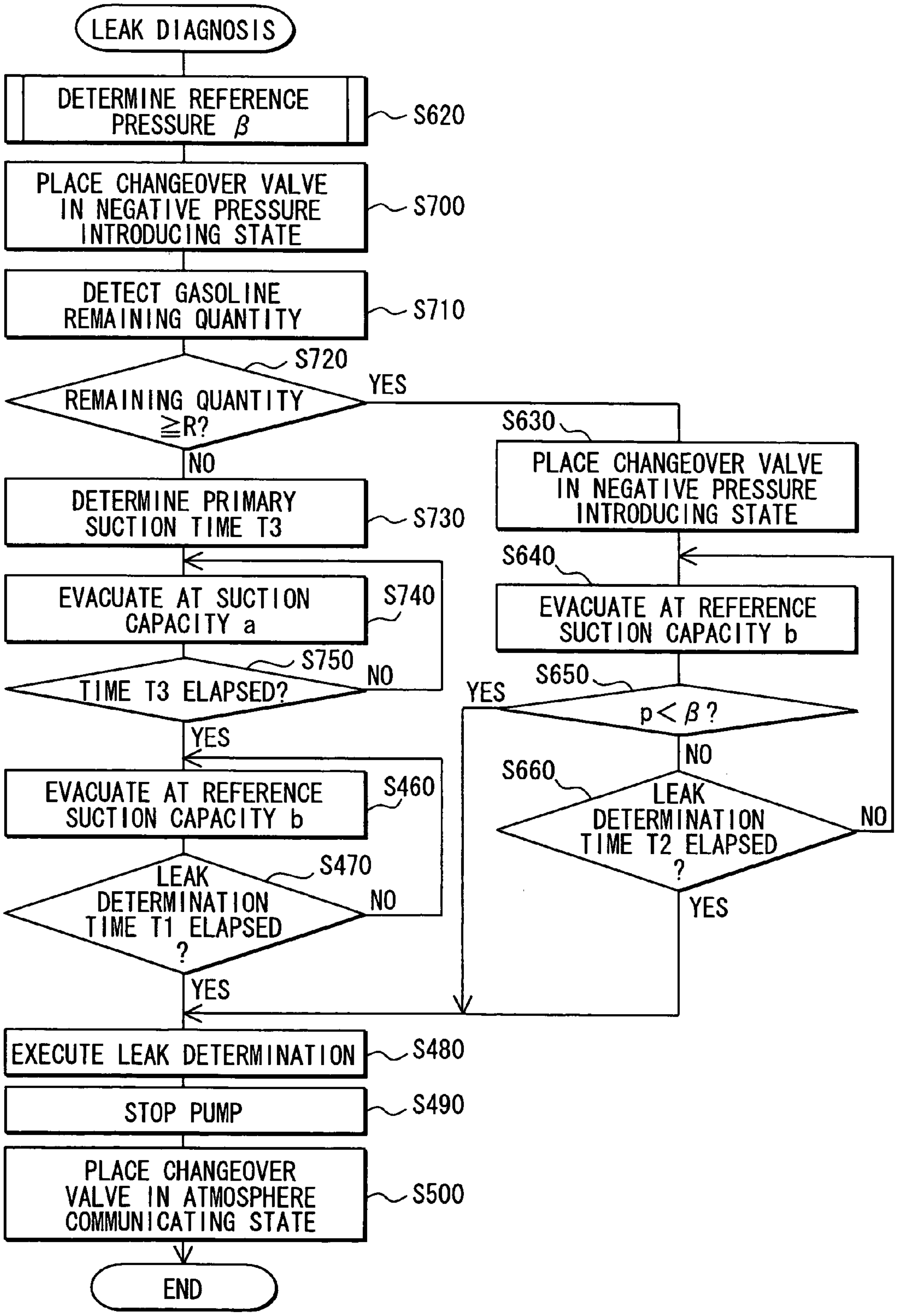
FIG. 7 is a leak diagnosis routine according to a third embodiment of the present invention.

In FIG. 7, step S620, which is the same as step S620 of FIG. 6, is executed to set the reference pressure β. Next, at step S700, the changeover valve 120 is changed to the negative pressure introducing state. Then, at step S710, the remaining gasoline quantity in the fuel tank 20 is determined by reading the signal from the fuel level sensor 220.

Next, at step S720, it is determined whether the remaining gasoline quantity, which is measured at step S710, is equal to or greater than a preset determination reference remaining quantity R. The determination reference remaining quantity R is set to be a relatively large value (a value close to an internal volume of the fuel tank 20), such as 90% or higher of the internal volume of the fuel tank 20. When YES is returned at step S720, the remaining gasoline quantity in the fuel tank 20 is relatively large, and thereby the gas volume in the sealed system including the purge apparatus 10 is relatively small. Thus, even when the vacuum pump 130 is driven at the suction capacity a, the diagnosis time cannot be significantly reduced. In view of this, the single step pump control operation using the reference suction capacity b like in the previously proposed technique is executed, i.e., steps S630 to S660 shown in FIG. 6 are executed.

In contrast, when NO is returned at step S720, control proceeds to step S730. At step S730, a primary suction time T3 is determined based on the remaining gasoline quantity measured at step S710 in view of the previously stored relationship between the remaining gasoline quantity and the primary suction time T3 (corresponding to the execution time of the primary drive control means) in a storage device (not shown). The primary suction time T3 is the time required to reduce the pressure in the sealed system including the purge apparatus 10 from the atmospheric pressure to the changeover pressure α in the case where the evacuating operation of the vacuum pump 130 at the suction capacity a is performed. Specifically, according to the first embodiment, it is determined whether the pressure has been reduced to the changeover pressure α through the actual measurement of the pressure p with the pressure sensor 140. In contrast, according to the third embodiment, it is determined whether the pressure has been reduced to the changeover pressure α through determination of whether the primary suction time T3, which is determined based on the remaining gasoline quantity, has been elapsed. When the remaining gasoline quantity is known, the gas volume in the sealed system including the purge apparatus 10 can be computed. Also, the pressure at the time of starting the evacuating operation of the vacuum pump 130, i.e., the atmospheric pressure shows a relatively small change, and thereby the amount of pressure, which needs to be reduced, can be relatively accurately determined. Therefore, it is possible to determine whether the pressure has been reduced to the changeover pressure α based on the elapsed time. According to the relationship, which has been previously stored in the storage device (not shown), the primary suction time T3 is reduced when the remaining gasoline quantity is increased, and vice versa.

After execution of step S730, control proceeds to step S740. At step S740, the predetermined pulse signal is outputted to the drive control circuit 134, so that the vacuum pump 130 is driven to evacuate at the predetermined high suction capacity a. When step S740 has been executed twice or more, the vacuum pump 130 has been already driven. Thus, in such a case, the driving of the vacuum pump 130 at the high suction capacity a is maintained at step S740.

Next, at step S750, it is determined whether the elapsed time since the time of starting the driving of the vacuum pump 130 at the suction capacity a has exceeded the primary suction time T3, which has been determined at step S730. When NO is returned at step S750, control returns to step S740 to maintain the evacuating operation at the suction capacity a. In contrast, when YES is returned at step S750, control proceeds to step S460 and the following steps, which are the same as those of FIG. 3 to make the leak determination.

Fourth Embodiment

Figure 8:
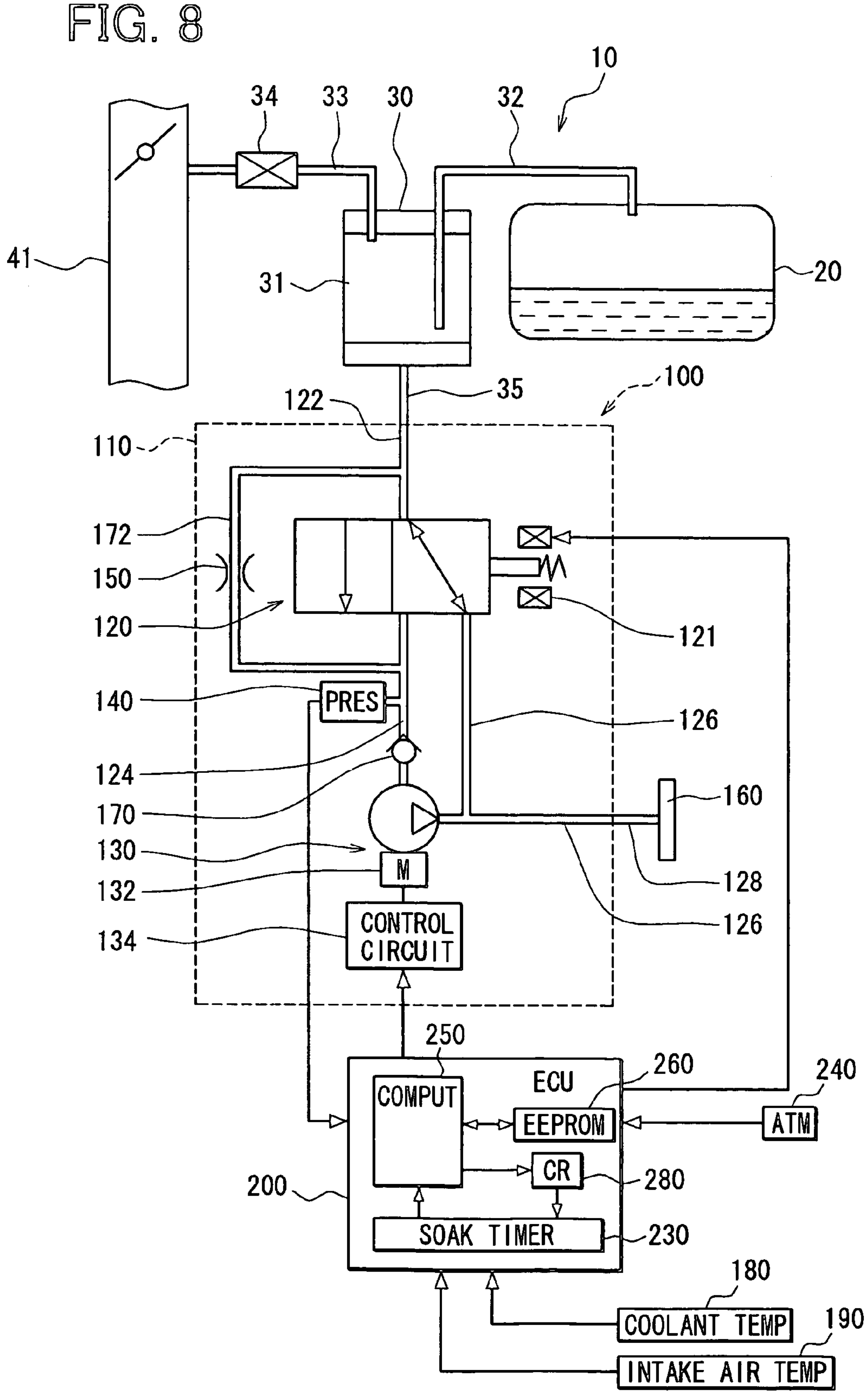
FIG. 8 is a schematic diagram showing a structure of a purge apparatus and a leak diagnosis system according to a fourth embodiment of the present invention.

A leak diagnosis system according to a fourth embodiment of the present invention will be described with reference to FIGS. 8 to 11. FIG. 8 is similar to FIG. 1 of the first embodiment and shows a structure of a purge apparatus 10 and a structure of the leak diagnosis system 100 according to the fourth embodiment. In the following description, components similar to those of the first embodiment will be indicated by the same numerals and will not be described further in detail for the sake of simplicity.

The leak diagnosis system 100, which diagnoses whether a leak hole is present in the purge apparatus 10, includes a leak check module 110, an electronic control unit (ECU) 200, a coolant temperature sensor 180, an intake air temperature sensor 190 and an atmospheric pressure sensor 240. The structure of the leak check module 110 is substantially the same as that of the first embodiment and thereby will not be described further.

When the purge valve 34 is closed, and the changeover valve 120 is placed into the negative pressure introducing state, the purge apparatus 10 and the leak check module 110 are placed into a sealed state and thereby form a sealed system. In this state, when the vacuum pump 130 is driven to evacuate the gas from an interior of the purge apparatus 10, the negative pressure prevails in the interior of the sealed system, and this negative pressure, i.e., a pressure pp in the purge apparatus 10 is measured with the pressure sensor 140. The purge apparatus 10 is always communicated with the fuel tank 20, so that the pressure pp inside the purge apparatus 10 can be regarded as the internal pressure of the fuel tank 20.

In contrast, in another state where the purge valve 34 is closed, and the changeover valve 120 is placed into the atmosphere communicating state, when the vacuum pump 130 is turned off, the atmospheric pressure prevails in the interior of the purge apparatus 10 and the interior of the leak check module 110, and this atmospheric pressure is measured with the pressure sensor 140. Furthermore, in this state where the purge valve 34 is closed, and the changeover valve 120 is communicated with the atmosphere, when the vacuum pump 130 is driven, the atmosphere communication passage 126, the canister communication passage 122 and a canister communication passage 122 side of the bypass passage 172, which is located on the canister communication passage 122 side of the reference orifice 150, have the atmospheric pressure. Also, at that time, the negative pressure introducing passage 124 and a negative pressure introducing passage 124 side of the bypass passage 172, which is located on the negative pressure introducing passage 124 side of the reference orifice 150, have the negative pressure. This negative pressure is sensed with the pressure sensor 140.

The suction capacity of the vacuum pump 130 is set to maintain the constant measured pressure, which is measured with the pressure sensor 140 at the time of placing the changeover valve 120 into the atmosphere communicating state and driving the vacuum pump. Now, it is assumed that the vacuum pump 130 is driven while the purge apparatus 10 is sealed to form the sealed system. In this state, when a leak hole, which has the inner diameter that is substantially the same as that of the reference orifice 150, exists in the purge apparatus 10, the measured pressure, which is measured with the pressure sensor 140, becomes a constant value (hereinafter, referred to as a determination reference pressure PTH) after elapse of a predetermined time period from the time of starting the vacuum pump 130. In contrast, when a larger leak hole, which has the inner diameter that is larger than that of the reference orifice 150, exists in the purge apparatus 10, the measured pressure, which is measured with the pressure sensor 140, becomes a larger value, which is larger than the determination reference pressure PTH, after the elapse of the predetermined time period. Furthermore, when no leak hole is present or when a smaller leak hole, which has the inner diameter that is sufficiently smaller than that of the reference orifice 150, exists in the purge apparatus 10, the measured pressure pp, which is measured with the pressure sensor 140, becomes equal to or less than the determination reference pressure PTH before elapse of the predetermined time period. Thus, the presence of the leak hole can be diagnosed, i.e., can be determined. Here, it should be understood that in place of the inner diameter of the reference orifice 150, the total opening cross sectional area of the reference orifice 150 may be used to determine the leak hole, like in the first embodiment.

The coolant temperature sensor 180 measures a temperature (a coolant temperature) of the engine coolant and outputs a signal, which indicates the engine coolant temperature tw, to the ECU 200. The intake air temperature sensor 190 is provided in the intake air pipe 41 or on an upstream side or downstream side of the intake air pipe 41. The intake air temperature sensor 190 measures the temperature of the air to be supplied to the engine, i.e., the intake air temperature ta and outputs a signal, which indicates the intake air temperature ta, to the ECU 200. The atmospheric pressure sensor 240 measures the air pressure outside of the vehicle, i.e., the atmospheric pressure pa and outputs a signal, which indicates the atmospheric pressure pa, to the ECU 200.

The pressure pp inside the purge apparatus 10 and the engine coolant temperature tw serve as pressure related information (also referred to as pressure related information values) that changes in response to a change (a pressure change) in the internal pressure inside the purge apparatus 10. Furthermore, the pressure sensor 140 and the coolant temperature sensor 180 serve as pressure related information sensors. As described above, the pressure related information (the pressure related information values) includes not only the pressure pp inside the purge apparatus 10 but also the engine coolant temperature tw for the following reason. That is, the pressure change inside the purge apparatus 10 may vary depending on the fuel vaporization in the fuel tank 20. However, a vaporized fuel quantity, which is a quantity of fuel vaporized in the fuel tank 20, is stabilized when the surrounding temperature around the fuel tank 20 is stabilized, and the stabilization of the engine coolant temperature indicates the stabilization of this surrounding temperature.

The intake air temperature ta and the atmospheric pressure pa serve as auxiliary information (auxiliary information values) that helps the determination of the pressure stabilization inside the purge apparatus 10, which is executed based on the pressure related information. Furthermore, the intake air temperature sensor 190 and the atmospheric pressure sensor 240 serve as auxiliary information sensors. The intake air temperature ta and the atmospheric pressure pa are used as the auxiliary information for the following reason. That is, when the intake air temperature ta is not stabilized, it can be determined that the engine is not stabilized (i.e., occurrence of a change in the rotational speed of the engine), and thereby the pressure pp inside the purge apparatus 10 is also not stabilized. Furthermore, a change in the atmospheric pressure pa can be considered as a change in a flow of the air or a change in an altitude of the vehicle. Thus, when the atmospheric pressure pa is not stabilized, it can be assumed that the vehicle is traveling, and thereby the pressure pp inside the purge apparatus 10 is not stabilized.

The ECU 200 includes a microcomputer 250, which includes a CPU, a ROM and a RAM (not shown). The ECU 200 further includes an electrically erasable programmable ROM (hereinafter, referred to as an EEPROM) 260 and a soak timer 230, which are connected to the microcomputer 250.

The soak timer 230 is started based on a timing signal supplied from a CR oscillating circuit 280 to measure a time when an undepicted ignition switch (IG switch) is turned off, i.e., when the engine is stopped. Therefore, the soak timer 230 measures the elapsed time since the time of stopping the engine. The CR oscillating circuit 280 is formed as a monolithic integrated circuit, therefore resulting in a reduced number of components and a reduced manufacturing cost.

When the IG switch is turned off, the ECU 200 executes a determination operation for determining whether the pressure pp inside the purge apparatus 10 has been stabilized. When it is determined that the pressure pp inside the purge apparatus 10 is stabilized, the ECU 200 executes leak diagnosis by controlling the vacuum pump 130.

Figure 9:
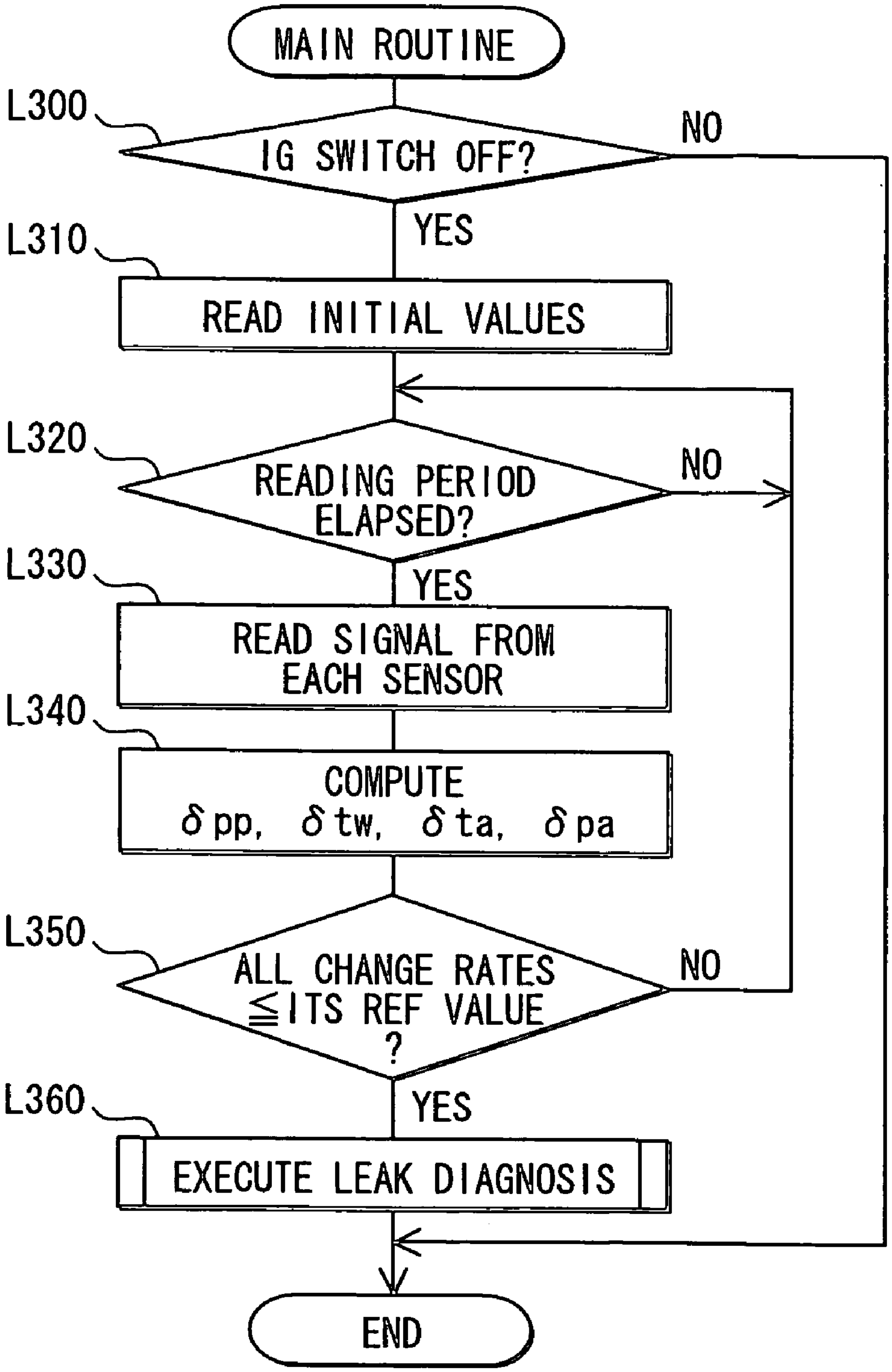
FIG. 9 is a main routine of a leak diagnosis control process executed by an ECU shown in FIG. 8.

Next, a leak diagnosis control operation, which is executed by the ECU 200, will be described. FIG. 9 shows a main routine of the leak diagnosis control operation executed by the ECU 200. This main routine is executed at relatively short intervals.

In FIG. 9, at step L300, it is determined whether the IG switch is in an OFF state, i.e., whether the engine is in a stop state. When NO is returned at step L300, the current routine ends. When it is determined that the IG switch is in the OFF state, steps L310 to L350, which corresponds to a stabilization determining means (also serving as a primary stabilization determining means and a secondary stabilization determining means) of the present invention, are executed.

At step L310, the signals from the pressure sensor 140, the coolant temperature sensor 180, the intake air temperature sensor 190 and the atmospheric pressure sensor 240 are read, and thereby an initial value of the pressure pp inside the purge apparatus 10, an initial value of the coolant temperature tw, an initial value of the intake air temperature ta and an initial value of the atmospheric pressure pa are stored in the RAM.

Then, at step L320, it is determined whether an elapsed time since the time of execution of step L310 or an elapsed time since the time of previous execution of step L330 has passed an end of a predetermined reading period, which has been previously stored. The reading period is set based on experiments and is sufficiently shorter than a time period, which is required to stabilize the pressure pp inside the purge apparatus 10, the coolant temperature tw, the intake air temperature ta and the atmospheric pressure pa since the time of the turning off of the IG switch.

When NO is returned at step L320, this step L320 is repeated until the reading period has elapsed. In contrast, when YES is returned at step L320, control proceeds to step L330. At step L330, the signals from the pressure sensor 140, the coolant temperature sensor 180, the intake air temperature sensor 190 and the atmospheric pressure sensor 240 are read, and the read signal values are stored in the RAM.

Next, at step L340, a change rate δpp (=pp(n)/pp(n−1)) of the pressure inside the purge apparatus 10 (an amount of change in the internal pressure of the purge apparatus 10 per unit time) is computed based on the latest measured pressure pp(n) inside the purge apparatus 10 and the previous measured pressure pp(n−1). Furthermore, a change rate δtw of the coolant temperature tw, a change rate δta of the intake air temperature ta and a change rate δpa of the atmospheric pressure pa are also computed in the same manner as that of the change rate δpp of the pressure inside the purge apparatus 10. Then, at step L350, it is determined whether each of these change rates δpp, δtw, δta, δpa is equal to or less than its corresponding predetermined reference value. In place of each of the change rates δpp, δtw, δta, δpa, a corresponding amount of change may be computed.

When NO is returned at step L350, control returns to step L320. The determination at step L350 is executed at every reading period, i.e., at constant intervals. Therefore, the determination of whether the pressure pp inside the purge apparatus 10, the coolant temperature tw, the intake air temperature ta and the atmospheric pressure pa are stabilized can be made shortly after the actual stabilization of the pressure pp inside the purge apparatus 10, the coolant temperature tw, the intake air temperature ta and the atmospheric pressure pa.

When YES is returned at step L350, it can be determined that the pressure pp inside the purge apparatus 10, the coolant temperature tw, the intake air temperature ta and the atmospheric pressure pa are all stabilized. Thus, control proceeds to step L360 where the leak diagnosis is executed.

Figure 10:
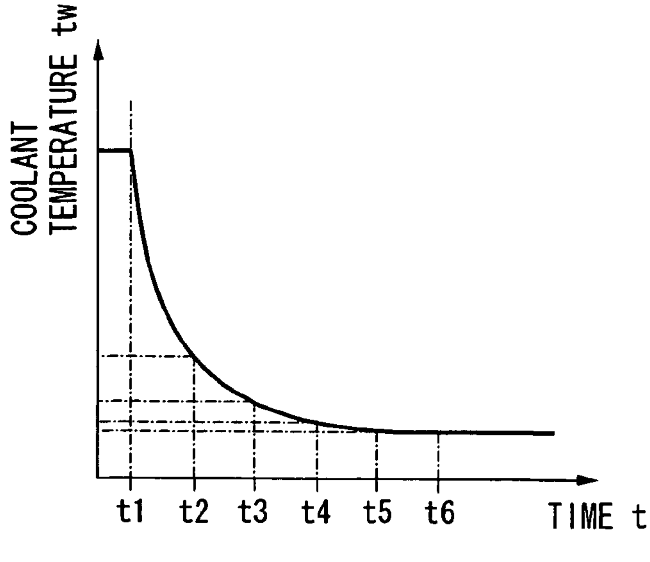
FIG. 10 is an exemplary diagram showing a change in coolant temperature at the time of executing the main routine of FIG. 9.

FIG. 10 is an exemplary diagram showing a change in the coolant temperature tw at the time of executing the main routine of FIG. 9. In FIG. 10, time T1 is the time of turning off of the IG switch, i.e., the time of reading the initial values described above at step L310. Each of time t2 to time t6 is the time of executing steps L330 to L350 upon elapse of the reading period to determine whether the pressure pp inside the purge apparatus 10, the coolant temperature tw, the intake air temperature ta and the atmospheric pressure pa have been stabilized. In the case of FIG. 10, it is determined that the coolant temperature tw is stabilized at the time t6.

Figure 11:
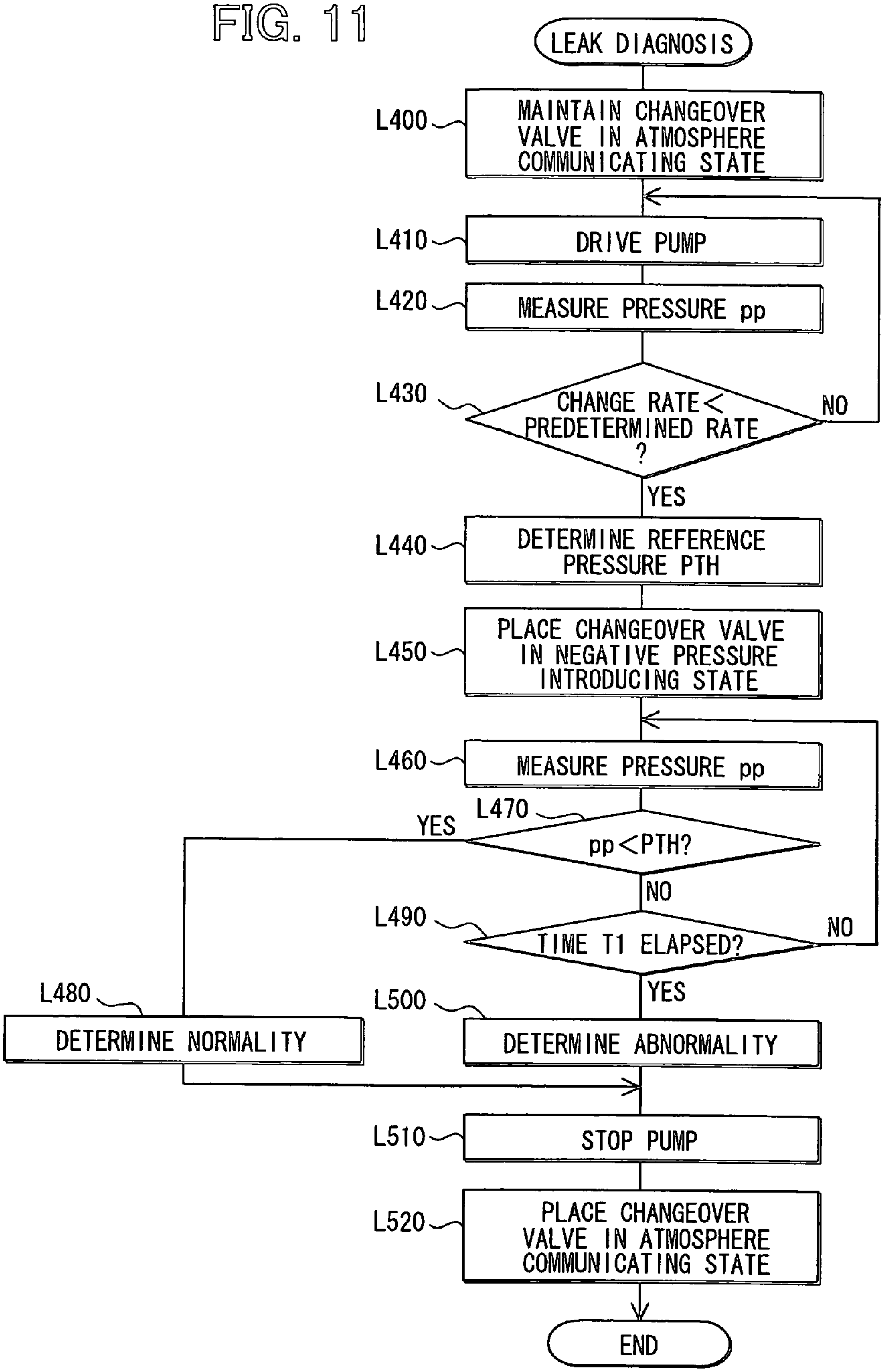
FIG. 11 is a leak diagnosis routine indicating a control operation of step L350 of FIG. 9 in detail.

Then, control proceeds to step L360 where a process indicated in FIG. 11 in detail is executed. First, at step L400 of FIG. 11, the changeover valve 120 is maintained in the atmosphere communicating state, and then control proceeds to step L410. At step L410, a predetermined pulse signal is outputted to the drive control circuit 134, so that the vacuum pump 130 is driven. Then, at step L420, the pressure pp inside the purge apparatus 10 is measured. That is, at step L420, the signal from the pressure sensor 140 is read.

Thereafter, at step L430, it is determined whether a change rate of the pressure pp, which is measured every time step L420 is repeated, becomes slower than a predetermined rate in order to determine whether the pressure pp has become a constant value. When NO is returned at step L430, control returns to step L410. In contrast, when YES is returned at step L430, control proceeds to step L440, and the current pressure pp, which is measured with the pressure sensor 140, is set as the reference pressure PTH.

Next, at step L450, the changeover valve 120 is changed to the negative pressure introducing state. In the OFF state of the IG switch, the purge valve 34 is in the fully closed state. Thus, after execution of step L450, the purge apparatus 10 and the leak check module 110 form the sealed system.

Then, at step L460, similar to step L420, the pressure pp inside the purge apparatus 10 is measured. Next, at step L470, it is determined whether the pressure pp measured at step L460 is lower than the reference pressure PTH determined at step L440. When YES is returned, it can be determined that the leak hole, which has the inner diameter equal to or greater than the inner diameter of the reference orifice 150, does not exist in the purge apparatus 10. Thus, the normality is determined at step L480. In contrast, when NO is returned at step L470, control proceeds to step L490. At step 490, it is determined whether the elapsed time since the time of starting the evacuation by the vacuum pump 130 at step L410 has reached an end of a predetermined leak determination time T1.

In the case where the elapsed time since the time of starting the evacuation by the vacuum pump 130 at step L410 has not elapsed the end of the leak determination time T1, NO is returned at step L490. Thus, control returns to step L460. When the pressure pp inside the purge apparatus 10 is not reduced below the reference pressure PTH after the elapse of the leak determination time T1, it can be assumed that the leak hole, which has the inner diameter equal to or greater than the inner diameter of the reference orifice 150, exists in the purge apparatus 10, and thereby the pressure pp does not decrease. Therefore, abnormality is determined at step L500.

After the determination of whether the leak hole exists at step L480 or L500, control proceeds to step L510. At step L510, the vacuum pump 130 is stopped. In the fourth embodiment, steps L410, L510 correspond to a pump drive control means of the present invention. Then, at step L520, the changeover valve 120 is placed in the atmosphere communicating state, and the current routine is terminated.

According to the fourth embodiment, the depressurization of the interior of the purge apparatus 10 is started to execute the leak diagnosis upon determination of the stabilization of the pressure pp inside the purge apparatus 10 and the engine coolant temperature tw, which serve as the pressure related information that changes in response to the change in the pressure pp inside the purge apparatus 10. Therefore, the time period, which is required from the stabilization of the purge apparatus 10 to the start of the leak diagnosis, is shortened. As a result, it is possible to start the diagnosing of the leak in the purge apparatus 10 within a shorter period of time in comparison to the previously proposed technique.

Fifth Embodiment

Next, a fifth embodiment of the present invention will be described. In the following description, components similar to those of the fourth embodiment will be indicated by the same numerals and will not be described further.

Figure 13:
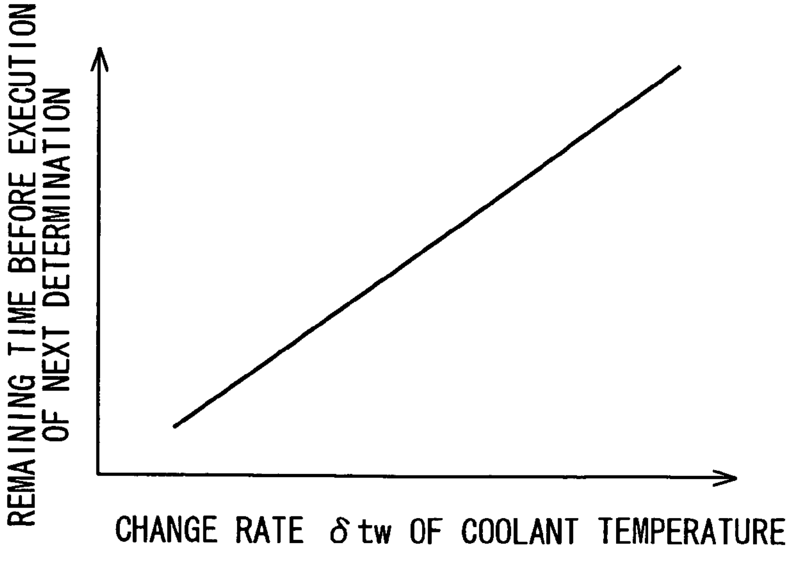
FIG. 13 is a diagram showing a relationship between a change rate of the engine coolant temperature and a remaining time before execution of a next stabilization determination stored in the EEPROM according to the fifth embodiment.
Figure 14:
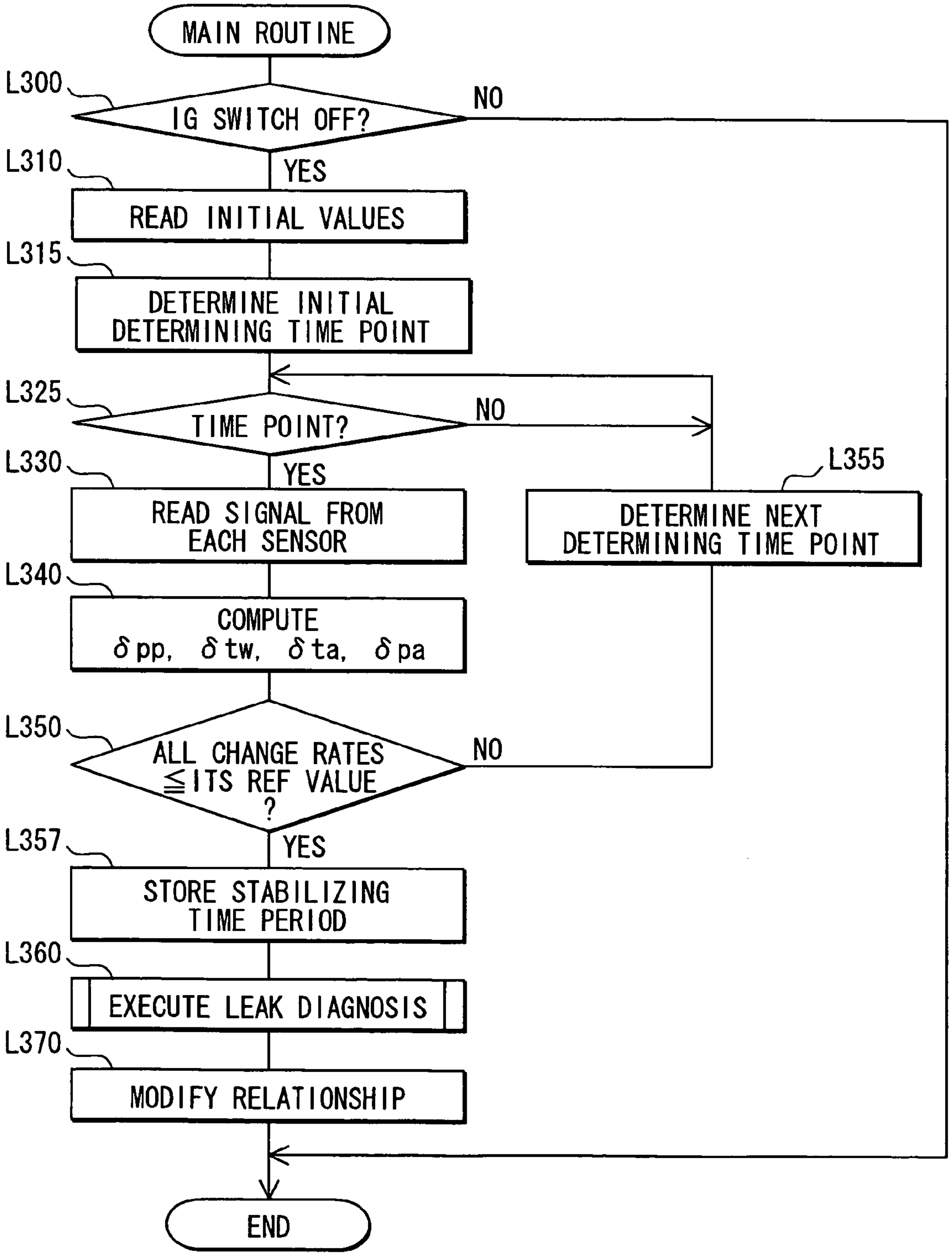
FIG. 14 is a main routine of a leak diagnosis control process executed by an ECU according to the fifth embodiment.

The fifth embodiment differs from the fourth embodiment in the following points. That is, in the fifth embodiment, the EEPROM 260 stores a relationship of FIG. 12 between the engine coolant temperature tw and an initial stabilization determining time point as well as a relationship of FIG. 13 between the change rate δtw of the engine coolant temperature and a remaining time before execution of the next stabilization determination. Furthermore, in the fifth embodiment, the control function of the ECU 200 differs from the control function of the fourth embodiment. FIG. 14 shows a main routine of a leak diagnosis control operation according to the fifth embodiment.

In the main routine of FIG. 14, like the fourth embodiment, steps L300, L310 are executed. Thus, when it is determined that the IG switch is in the off state, an initial value of the pressure pp inside the purge apparatus 10, an initial value of the coolant temperature tw, an initial value of the intake air temperature ta and an initial value of the atmospheric pressure pa are stored in the RAM.

Figure 12:
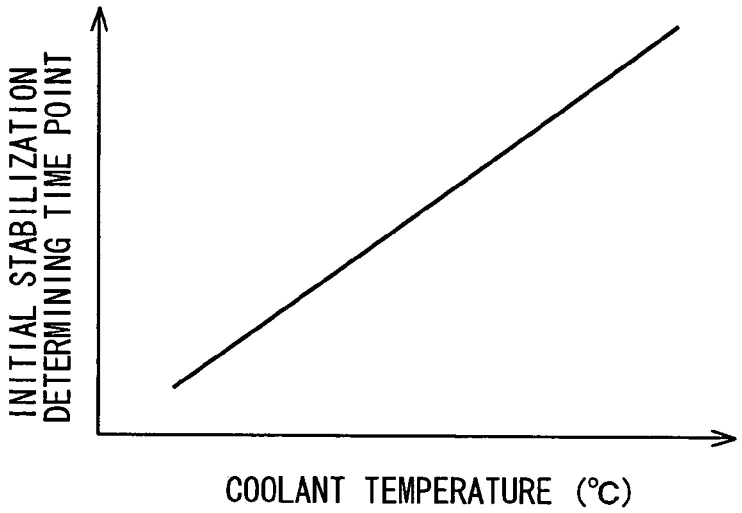
FIG. 12 is a diagram showing a relationship between an engine coolant temperature and an initial stabilization determining time point stored in an EEPROM according to a fifth embodiment of the present invention.

Next, at step L315, the initial stabilization determining time point is determined based on the coolant temperature tw stored at step L310 in view of the relationship of FIG. 12. The relationship of FIG. 12 indicates that the initial stabilization determining time point is proportionally delayed when the engine coolant temperature tw is increased, and vice versa. Thus, when the coolant temperature tw is relatively high right after turning off of the IG switch (turning off of the engine), the initial stabilization determining time point is further delayed to a late time point.

Then, at step L325, it is determined whether the initial stabilization determining time point determined at step L315 has been reached, or alternatively it is determined whether a next stabilization determining time point determined at step L355 has been reached. When NO is returned at step L325, this step L325 is repeated. In contrast, when YES is returned at step L325, control proceeds to step L330. Thus, like the fourth embodiment, steps L330 to L350 are executed to determine whether the pressure pp inside the purge apparatus 10, the coolant temperature tw, the intake air temperature ta and the atmospheric pressure pa are all stabilized.

When NO is returned at step L350, control proceeds to step L355. At step L355, a remaining time before execution of the next stabilization determination is determined based on the change rate δtw of the coolant temperature computed at step L340 in view of the relationship shown in FIG. 13. The relationship of FIG. 13 indicates that the remaining time before execution of the next stabilization determination is proportionally shortened when the change rate δtw of the coolant temperature tw is reduced, and vice versa. Thus, when the change in the coolant temperature tw becomes smaller, the stabilization determination is more frequently executed. Therefore, a time difference between the time of actually stabilizing the coolant temperature tw and the time of returning YES at step L350 is shortened. As a result, the stating of the leak diagnosis (step L360) is advanced in terms of time. In contrast, when the change in the coolant temperature tw becomes larger, the time interval between the one execution of the stabilization determination and the next execution of the stabilization determination is lengthened. As a result, it is possible to reduce or minimize the consumption of the electric power supplied from the battery.

When the remaining time before the execution of the next stabilization determination is determined at step L355, control returns to step L325. When YES is returned at step L350, control proceeds to step L357. At step L357, a time period between the time of turning off of the IG switch and the time of returning YES at step L350 is stored in the EEPROM 260 as a stabilizing time period. In the fifth embodiment, the EEPROM 260 serves as a storage means of the present invention. Thereafter, step L360, which is the same as step L360 of the fourth embodiment, is executed to diagnose whether the leak hole exits in the purge apparatus 10.

When step L360 is executed, control proceeds to step L370. At step L370, the relationship of FIG. 12 between the engine coolant temperature tw and the initial stabilization determining time point is modified based on the stabilizing time period stored at step L357. The modification method of step L370 can be any appropriate method as long as the initial stabilization determining time point is more closely approximated to an end point of the stabilizing time period stored at step L357. For example, when a time period between the initial stabilization determining time point and the time of returning YES at step L350 exceeds a predetermined time period, an intercept of the straight line of FIG. 12 may be reduced by a predetermined value, or a slope of the straight line of FIG. 12 may be reduced by a predetermined value. In the fifth embodiment, steps L310 to L357 and L370 correspond to the stabilization determining means (the primary stabilization determining means and the secondary stabilization determining means) of the present invention.

According to the fifth embodiment, the depressurization of the interior of the purge apparatus 10 is started to execute the leak diagnosis upon determination of the stabilization of the pressure pp inside the purge apparatus 10 and the engine coolant temperature tw, which serve as the pressure related information that changes in response to the change in the pressure pp inside the purge apparatus 10. Therefore, the time period, which is required from the stabilization of the purge apparatus 10 to the start of the leak diagnosis, is shortened. As a result, it is possible to start the diagnosing of the leak in the purge apparatus 10 within a shorter period of time in comparison to the previously proposed technique.

Furthermore, according to the fifth embodiment, when the initial value of the coolant temperature tw after the turning off of the engine becomes higher, the time point of the initial execution of step L350 for determining whether the coolant temperature tw and others are stabilized is more delayed. Thus, it is possible to reduce the number of times of unnecessary determination for determining whether the coolant temperature tw and the others are stabilized before the stabilization of the pressure pp inside the purge apparatus 10 takes place. As a result, it is possible to reduce or minimize the consumption of the electric power supplied from the battery.

Furthermore, according to the fifth embodiment, when the change rate δtw of the coolant temperature tw becomes smaller, the remaining time before execution of the next stabilization determination determined at step L355 is reduced. Thus, it is possible to determine that the coolant temperature tw and the others are stabilized in the earlier stage. Furthermore, when the reduction of the remaining time before execution of the next stabilization determination caused by the reduction of the change rate δtw of the coolant temperature tw is true, the following is also true. That is, when the change rate δtw of the coolant temperature tw becomes larger, the remaining time before execution of the next stabilization determination is increased. Thus, even in this way, it is possible to reduce the number of times of unnecessary determination for determining whether the coolant temperature tw and the others are stabilized before the stabilization of the pressure pp inside the purge apparatus 10 takes place. As a result, it is possible to reduce or minimize the consumption of the electric power supplied from the battery.

Sixth Embodiment

Next, a sixth embodiment of the present invention will be described. The sixth embodiment differs from the fourth embodiment in the following points. That is, according to the sixth embodiment, the EEPROM 260 stores a relationship (hereinafter, referred to as a stabilizing time period determinative relationship), which determines the stabilizing time period based on an initial value of the pressure pp in the purge apparatus 10, an initial value of the coolant temperature tw, an initial value of the intake air temperature ta and an initial value of the atmospheric pressure pa. Furthermore, the control function of the ECU 200 according to the sixth embodiment differs from that of the fourth embodiment. The stabilizing time period determinative relationship is predetermined through the experiments. When the initial value of the pressure pp inside the purge apparatus 10, the initial value of the coolant temperature tw and the others are known, a change in each of them can be predicted based on the experimental data.

Figure 15:
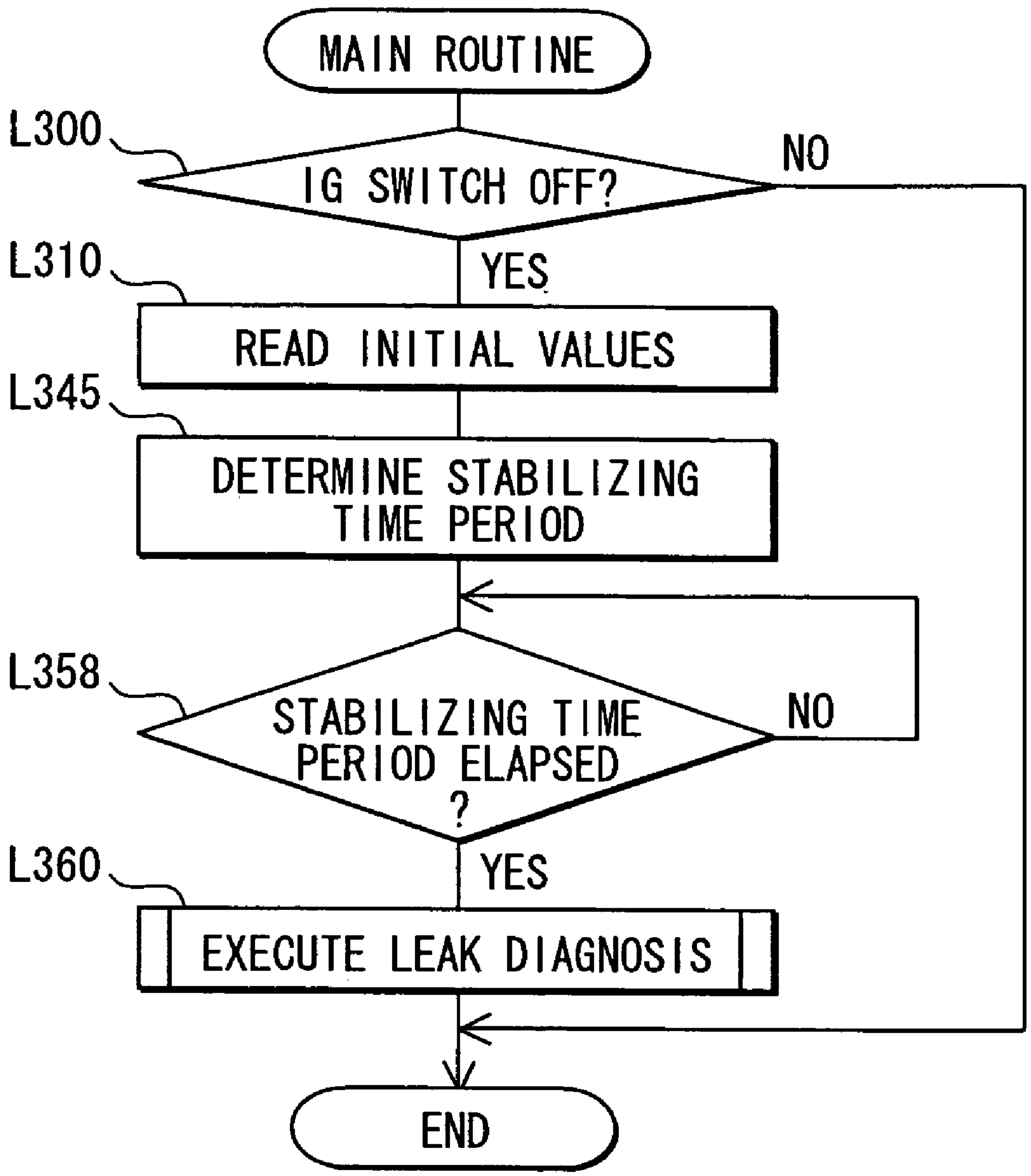
FIG. 15 is a main routine of a leak diagnosis control process executed by an ECU according to a sixth embodiment.

FIG. 15 shows a main routine of a leak diagnosis control operation according to the sixth embodiment. In the main routine of FIG. 15, like the fourth embodiment, steps L300, L310 are executed. Thus, when it is determined that the IG switch is in the off state, an initial value of the pressure pp inside the purge apparatus 10, an initial value of the coolant temperature tw, an initial value of the intake air temperature ta and an initial value of the atmospheric pressure pa are stored in the RAM.

Next, at step L345, the stabilizing time period is determined based on the stabilizing time period determinative relationship stored in the EEPROM 260 and each of the initial values read at step L310. Then, at step L358, it is determined whether the elapsed time since the time of turning off of the IG switch has passed the end of the stabilizing time period, which is determined at step L345. When NO is returned at step L358, this step L358 is repeated until the stabilizing time period is over.

In contrast, when it is determined that the stabilizing time period is over at step L358, it is possible to assume that the pressure pp inside the purge apparatus 10, the coolant temperature tw, the intake air temperature ta and the atmospheric pressure pa are stabilized at step L358. Thus, control proceeds to step L360 where the leak diagnosis is executed. In the sixth embodiment, steps L310 to L358 correspond to the stabilization determining means (the primary stabilization determining means and the secondary stabilization determining means) of the present invention.

According to the sixth embodiment, the depressurization of the interior of the purge apparatus 10 is started to execute the leak diagnosis upon determination of the stabilization of the pressure pp inside the purge apparatus 10 and the engine coolant temperature tw, which serve as the pressure related information that changes in response to the change in the pressure pp inside the purge apparatus 10. Therefore, the time period, which is required from the stabilization of the purge apparatus 10 to the start of the leak diagnosis, is shortened. As a result, it is possible to start the diagnosing of the leak in the purge apparatus 10 within a shorter period of time in comparison to the previously proposed technique.

Furthermore, according to the sixth embodiment, at the time of determining whether the pressure pp inside the purge apparatus 10, the signals from the pressure sensor 140, the coolant temperature sensor 180, the intake air temperature sensor 190 and the atmospheric pressure sensor 240 are read only once. Thus, it is possible to limit the electric power consumption from the battery.

The various embodiments of the present invention have been described. However, the present invention is not limited to the above embodiments and should cover the following modifications of the above embodiment, which are within the scope of the present invention.

For example, in each of the first to sixth embodiments, the vacuum pump 130 is provided to evacuate the interior of the purge apparatus 10. In place of the vacuum pump 130, a positive pressure pump, which positively pressurizes the interior of the purge apparatus 10, may be provided.

Also, the vacuum pump 130 of each of the first to sixth embodiments is the displacement pump, the capacity of which is changed through the pulse width modulation of the rotational speed of the electric motor 132. Alternative to the pulse width modulation, any other known modulation, such as frequency modulation, may be used. Also, the pump 130 is not limited to the displacement pump and may alternatively be a turbo pump, such as a centrifugal turbo pump. Also, in place of the single pump 130, a variable pump arrangement, which includes a plurality of pumps, may be provided. In such a case, the primary drive control means may use a larger number of the pumps out of the plurality of pumps in comparison to that of the secondary drive means.

Furthermore, in each of the first to sixth embodiments, the conditions for executing the leak diagnosis include the turning off of the IG switch (step S300) and the elapse of the predetermined stabilizing time period (S310). In addition to these ones, the conditions for executing the leak diagnosis may additionally include other ones, such as elapsing of a predetermined driving time for driving the vehicle and/or presence of the outside temperature equal to or greater than a predetermined temperature.

Furthermore, in each of the first to sixth embodiments, the leak determination time T1 at step S470 or L490 is the preset fixed time. Alternatively, the leak determination time T1 may be determined based on the remaining gasoline quantity in the fuel tank 20 in view of the preset relationship, which is preset to decrease the leak determination time T1 when the remaining gasoline quantity in the fuel tank 20 increases, and vice versa.

Furthermore, in each of the first to sixth embodiments, the leak diagnosis is performed while the engine is stopped by turning off of the IG switch. Alternatively, the leak diagnosis may be performed during an idling operation of the engine.

Furthermore, in the leak diagnosis system 100 in each of the first to sixth embodiments; a mesh filter(s) may be provided in, for example, a portion of the bypass passage 172, which is located on the canister 30 side of the reference orifice 150 and/or a portion of the negative pressure introducing passage 124, which is located on the changeover valve 120 side of the connection of the pressure sensor 140 to the negative pressure introducing passage 124 and/or a portion of the atmosphere communication passage 126, which is adjacent to the vacuum pump 130.

In the fourth to sixth embodiments, the pressure pp inside the purge apparatus 10 and the coolant temperature tw are both used as the pressure related information. Alternatively, only one of the pressure pp inside the purge apparatus 10 and the coolant temperature tw may be used as the pressure related information.

In the fourth to sixth embodiments, besides determining whether the pressure pp inside the purge apparatus 10 and the coolant temperature tw are stabilized, it is also determined whether the intake air temperature ta and the atmospheric pressure pa, which are the auxiliary information, are stabilized. Alternatively, it is possible to use only the pressure related information (i.e., the pressure pp inside the purge apparatus 10 and the coolant temperature tw) to determine whether the pressure inside the purge apparatus 10 is stabilized without using the auxiliary information (i.e., the intake air temperature ta and the atmospheric pressure pa). However, in the case where only the coolant temperature tw is used as the pressure related information, it is possible to more accurately determine whether the pressure inside the purge apparatus 10 is stabilized by determining whether the above auxiliary information is stabilized.

Furthermore, the relationship between the engine coolant temperature tw and the initial stabilization determining time point does not need to be the proportional relationship (the linear relationship) shown in FIG. 12 and may be alternatively a non-linear relationship (e.g., a curvilinear relationship). Also, the relationship between the change rate δtw of the engine coolant temperature and the remaining time before execution of the next stabilization determination may also be a curvilinear relationship.

Furthermore, in the sixth embodiment, the stabilizing time period determinative relationship stored in the EEPROM 260 is set to determine the stabilizing time period based on the initial value of the pressure pp inside the purge apparatus 10, the initial value of the coolant temperature tw, the initial value of the intake air temperature ta and the initial value of the atmospheric pressure pa. However, it is possible to estimate the stabilizing time period based on only one of the pressure pp inside the purge apparatus 10 and the coolant temperature tw, which are the pressure related information. Thus, at least one the initial value of the pressure pp inside the purge apparatus 10 and the initial value of the coolant temperature tw may be used as the initial value(s) for the stabilizing time period determinative relationship.

Furthermore, in the fifth embodiment, the relationship shown in FIG. 12 is modified at step L370. This modification is based on only the latest stabilizing time period. Alternatively, the modification of the relationship shown in FIG. 12 may be executed based on the latest value as well as previous value(s) of the stabilizing time period. For instance, the stabilizing time period may be stored every time the leak diagnosis is executed, and the modification of the relationship shown in FIG. 12 may be based on the stored values of stabilizing time period. For instance, the relationship shown in FIG. 12 may be modified based on an average value of some of or all of the stored values of the stabilizing time period.

Furthermore, in the fourth embodiment, in which the stabilization is determined every predetermined reading period, it is possible to modify the initial stabilization determining time point based on the stabilizing time period, like in the fifth embodiment.

Furthermore, any one or more features of any one (or more) of the above embodiments and the modifications may be combined with any one or more features of another one (or more) of the above embodiments and the modifications. For instance, the fourth embodiment may be combined with the first embodiment. In such a case, only upon the stabilization of the internal pressure of the purge apparatus 10, the pump 130 is driven at the suction capacity a and is then driven at the suction capacity b. In this way, more accurate diagnosis of the leak hole is made possible in the first embodiment.

Additional advantages and modifications will readily occur to those skilled in the art. The invention in its broader terms is therefore not limited to the specific details, representative apparatus, and illustrative examples shown and described.

What is claimed is:

1. A leak diagnosis system for a vehicle having an internal combustion engine, the leak diagnosis system comprising:

a fuel tank that receives fuel;

a purge apparatus that is communicated with the fuel tank and purges fuel gas, which is generated through vaporization of the fuel in the fuel tank, into an intake air pipe of the engine;

a pressure sensor that senses an internal pressure of the purge apparatus;

a pump that has an adjustable pump capacity and supplies a pressure to an interior of the purge apparatus;

a primary drive control means for driving the pump in a first stage at a first pumping capacity;

a secondary drive control means for driving the pump in a second stage after the first stage at a second pumping capacity, which is lower than the first pumping capacity, wherein the second pumping capacity is set such that when at least one leak hole, which forms a predetermined total opening cross sectional area, exists in the purge apparatus, the driving of the pump at the second pumping capacity by the secondary drive control means substantially maintains a predetermined reference pressure in the purge apparatus; and a diagnosing means for diagnosing whether a leak hole exits in the purge apparatus based on the pressure measured with the pressure sensor in view of the predetermined reference pressure at the time of driving the pump in the second stage at the second pumping capacity by the secondary drive control means.

2. The leak diagnosis system according to claim 1, wherein the secondary drive control means starts driving the pump in the second stage when the pressure measured with the pressure sensor reaches a predetermined changeover pressure, which is between the predetermined reference pressure and an atmospheric pressure.

3. The leak diagnosis system according to claim 1, further comprising a fuel level sensor that measures a remaining fuel quantity in the fuel tank, wherein the primary drive control means drives the motor in the first stage for a predetermined operational time period, which is determined based on the remaining fuel quantity measured with the fuel sensor in view of prestored information that indicates a relationship between the remaining fuel quantity and the operational time period of the primary drive control means.

4. The leak diagnosis system according to claim 3, wherein when the remaining fuel quantity measured with the fuel level sensor is equal to or greater than a predetermined reference quantity, the primary drive control means is disabled, and the secondary drive control means is enabled to drive the pump in both of the first and second stages at the second pumping capacity.

5. The leak diagnosis system according to claim 4, wherein the predetermined reference quantity is equal to or greater than 90% of an internal volume of the fuel tank.

6. The leak diagnosis system according to claim 1, further comprising:

a vehicle battery that supplies electric power to the pump;

a battery charge level sensing means for measuring a remaining charge level of the battery;

the primary drive control means and the second drive control means are both enabled to drive the pump in the first and second stages, respectively, when the charge level measured with the battery charge level sensing means is equal to or greater than a primary control enabling value;

the primary drive control means is disabled when the charge level measured with the battery charge level sensing means is less than the primary control enabling value; and the secondary drive control means is enabled to drive the pump in both of the first and second stages when the charge level measured with the battery charge level sensing means is less than the primary control enabling value but is equal to or greater than a secondary control enabling value, which is lower than the primary control enabling value.

7. The leak diagnosis system according to claim 1, wherein the pump is a single pump in the diagnosis system.

8. The leak diagnosis system according to claim 1, further comprising:

a changeover valve that is changeable between a first state and a second state, wherein:

in the first state, the changeover valve communicates between the purge apparatus and a surrounding atmosphere;

in the second state, the changeover valve communicates between the purge apparatus and the pump; and a bypass passage that bypasses the changeover valve and always communicates between the purge apparatus and the pump.

9. The leak diagnosis system according to claim 8, further comprising a pressure setting means for variably setting at least one of the predetermined reference pressure and the changeover pressure when the pump is driven by the secondary drive control means at the second pumping capacity under the first state of the changeover valve.

10. The leak diagnosis system according to claim 9, wherein the pressure setting means sets the predetermined reference pressure when a change rate of the pressure measured with the pressure sensor becomes less that a predetermined rate.

11. The leak diagnosis system according to claim 1, wherein the pump is a vacuum pump that supplies a negative pressure to the interior of the purge apparatus.

12. The leak diagnosis system according to claim 1, further comprising:

at least one pressure related information sensor, each of which measures a corresponding pressure related information value, which changes in response to a pressure change in the purge apparatus; and a primary stabilization determining means for determining whether the at least one pressure related information value measured with the at least one pressure related information sensor is substantially stabilized, wherein:

when the primary stabilization determining means determines that the at least one pressure related information value is not substantially stabilized, the primary drive control means and the secondary drive control means are both disabled in the first and second stages; and when the primary stabilization determining means determines that the at least one pressure related information value is substantially stabilized, the primary drive control means and the secondary drive control means are enabled to drive the pump in the first and second stages, respectively.

13. The leak diagnosis system according to claim 12, wherein the at least one pressure related information value includes at least one of the internal pressure of the purge apparatus and a coolant temperature of engine coolant of the engine.

14. The leak diagnosis system according to claim 12, further comprising:

at least one of an intake air temperature sensor, which measures an intake air temperature of the engine, and an atmospheric pressure sensor, which measure an atmospheric pressure; and a secondary stabilization determining means for determining whether the at least one of the intake air temperature and the atmospheric pressure is substantially stabilized, wherein the primary drive control means and the secondary drive control means are enabled to drive the pump in the first and second stages, respectively, upon satisfaction of all of the following conditions:

the primary stabilization determining means determines that the at least one pressure related information value is substantially stabilized; and the secondary stabilization determining means determines that the at least one of the intake air temperature and the atmospheric pressure is substantially stabilized.

15. The leak diagnosis system according to claim 12, wherein the primary stabilization determining means determines whether the at least one pressure related information value is stabilized based on an amount of change in each of the at least one pressure related information value per unit time.

16. The leak diagnosis system according to claim 15, wherein the unit time is a predetermined fixed time period, which is previously determined.

17. The leak diagnosis system according to claim 15, wherein:

the unit time is a variable time period; and the variable time period is shortened when a current determination result of the primary stabilization determining means indicates that the amount of change in each of the at least one pressure related information value per unit time is reduced in comparison to the amount of change in each of the at least one pressure related information value per unit time in a previous determination result of the primary stabilization determining means.

18. The leak diagnosis system according to claim 15, wherein:

the at least one pressure related information sensor includes a coolant temperature sensor, which measures a coolant temperature of engine coolant of the engine;

the primary stabilization determining means determines an initial stabilization determining time point based on an initial value of the coolant temperature, which is measured first time with the coolant temperature sensor after turning off the engine in view of prestored information that indicates a relationship between the coolant temperature and the initial stabilization determining time point; and the relationship between the coolant temperature and the initial stabilization determining time point is set such that when the coolant temperature becomes higher, the initial stabilization determining time point is further delayed.

19. The leak diagnosis system according to claim 12, further comprising a storage means for storing a stabilizing time period from a time of turning off the engine to a time of determining that the at least one pressure related information value is substantially stabilized by the primary stabilization determining means, wherein the primary stabilization determining means adjusts the initial stabilization determining time point based on the stabilizing time period stored in the storage means.

20. The leak diagnosis system according to claim 12, wherein:

the primary stabilization determining means determines that the at least one pressure related information value is substantially stabilized when a stabilizing time period is elapsed since a time of turning off of the engine; and the primary stabilization determining means determines the stabilizing time period based on:

a relationship between an initial value of each of the at least one pressure related information value after turning off of the engine and the stabilizing time period of the corresponding pressure related information value; and an actual measured value of each of the at least one pressure related information value, which is measured with a corresponding one of the at least one pressure related information sensor right after turning off of the engine.

21. A leak diagnosis system for a vehicle having an internal combustion engine, the leak diagnosis system comprising:

a fuel tank that receives fuel;

a purge apparatus that is communicated with the fuel tank and purges fuel gas, which is generated through vaporization of the fuel in the fuel tank, into an intake air pipe of the engine;

a pressure sensor that senses an internal pressure of the purge apparatus;

a pump that has an adjustable pump capacity and supplies a pressure to an interior of the purge apparatus; and a controller that controls the pump and diagnoses whether a leak hole exists in the purge apparatus, wherein:

the controller drives the pump in a first stage at a first pumping capacity;

the controller drives the pump in a second stage after the first stage at a second pumping capacity, which is lower than the first pumping capacity, wherein the second pumping capacity is set such that when at least one leak hole, which forms a predetermined total opening cross sectional area, exists in the purge apparatus, the driving of the pump at the second pumping capacity substantially maintains a predetermined reference pressure in the purge apparatus; and the controller diagnoses whether a leak hole exits in the purge apparatus based on the pressure measured with the pressure sensor in view of the predetermined reference pressure at the time of driving the pump in the second stage at the second pumping capacity.

22. A leak diagnosis method comprising:

driving a pump in a first stage at a first pumping capacity, wherein the pump supplies a pressure to an interior of a purge apparatus that is communicated with a fuel tank of a vehicle and purges fuel gas, which is generated through vaporization of fuel in the fuel tank, into an intake air pipe of an internal combustion engine of the vehicle;

driving the pump in a second stage after the first stage at a second pumping capacity, which is lower than the first pumping capacity, wherein the second pumping capacity is set such that when at least one leak hole, which forms a predetermined total opening cross sectional area, exists in the purge apparatus, the driving of the pump at the second pumping capacity substantially maintains a predetermined reference pressure in the purge apparatus; and diagnosing whether a leak hole exits in the purge apparatus based on an internal pressure of the purge apparatus measured with a pressure sensor in view of the predetermined reference pressure at the time of driving the pump in the second stage at the second pumping capacity.

23. The leak diagnosis method according to claim 22, wherein the driving of the pump in the second stage includes starting the driving of the pump in the second stage when the internal pressure of the purge apparatus measured with the pressure sensor reaches a predetermined changeover pressure, which is between the predetermined reference pressure and an atmospheric pressure.

24. The leak diagnosis method according to claim 22, wherein the driving of the pump in the first stage includes driving the motor in the first stage for a predetermined operational time period, which is determined based on a remaining fuel quantity in the fuel tank measured with a fuel sensor in view of prestored information that indicates a relationship between the remaining fuel quantity and the operational time period of the first stage.

25. The leak diagnosis method according to claim 22, further comprising:

enabling both of the driving of the pump in the first stage at the first pumping capacity and the driving of the pump in the second stage at the second pumping capacity when a charge level of a vehicle battery is equal to or greater than a primary control enabling value and is thereby enables driving of the pump by electric power supplied from the battery;

disabling the driving of the pump at the first pumping capacity when the charge level of the battery is less than the primary control enabling value; and enabling the driving of the pump at the second pumping capacity in both of the first and second stages when the charge level of the battery is less than the primary control enabling value but is equal to or greater than a secondary control enabling value, which is lower than the primary control enabling value.

26. The leak diagnosis method according to claim 22, further comprising disabling the driving of the pump in the first stage at the first pumping capacity and the driving of the pump in the second stage at the second pumping capacity when it is determined that at least one pressure related information value, which changes in response to a pressure change in the purge apparatus, is not substantially stabilized.

* * * * *